(12) United States Patent
Simpson et al.

(10) Patent No.: US 12,246,796 B2
(45) Date of Patent: Mar. 11, 2025

(54) TOOTHED CHAIN FOR A BICYCLE

(71) Applicant: Ratio Technology Limited, Cambridge (GB)

(72) Inventors: Tom Simpson, Cambridge (GB); Felix Barker, Cambridge (GB)

(73) Assignee: Ratio Technology Limited, Cambridge (GB)

( * ) Notice: Subject to any disclaimer, the term of this patent is extended or adjusted under 35 U.S.C. 154(b) by 30 days.

(21) Appl. No.: 17/936,683

(22) Filed: Sep. 29, 2022

(65) Prior Publication Data

US 2023/0023623 A1    Jan. 26, 2023

Related U.S. Application Data

(63) Continuation of application No. PCT/GB2021/050790, filed on Mar. 30, 2021.

(30) Foreign Application Priority Data

Mar. 30, 2020    (GB) ..................... 2004651

(51) Int. Cl.
*F16G 13/04* (2006.01)
*B62M 9/10* (2006.01)
(Continued)

(52) U.S. Cl.
CPC ............ *B62M 9/10* (2013.01); *F16G 13/04* (2013.01); *F16G 13/07* (2013.01); *B62M 2009/005* (2013.01); *B62M 2009/007* (2013.01)

(58) Field of Classification Search
CPC .......... F16G 13/07; F16G 13/04; F16G 13/02; B62M 9/10; B62M 2009/005; B62M 2009/007
(Continued)

(56) References Cited

U.S. PATENT DOCUMENTS 1,027,352 A * 5/1912 Morse ................. F16G 13/04
                                                474/215
1,947,734 A * 2/1934 Perry ................. F16G 13/04
                                                474/214
(Continued)

FOREIGN PATENT DOCUMENTS

CN    104455208 A    3/2015
CN    105864376 A    8/2016
(Continued)

OTHER PUBLICATIONS

International Search Report and Written Opinion dated Jul. 5, 2021 for PCT Application No. PCT/GB2021/050790.
(Continued)

*Primary Examiner* — Michael R Mansen
*Assistant Examiner* — Katelynne R Burrell
(74) *Attorney, Agent, or Firm* — EIP US LLP

(57) ABSTRACT

A chain for a bicycle, a sprocket cassette, a chainring, a crankset, a chain drive system, and a bicycle are provided. The chain comprises a plurality of interleaved link elements, each link element being pivotably attached to at least one other link element and comprising at least two teeth. A flank of each tooth is adapted to engage with a flank of a sprocket tooth. The sprocket cassette comprises one or more sprockets, each comprising a plurality of sprocket teeth, wherein each sprocket tooth has a flank with a profile corresponding to a profile of at least part of a tooth of each of the plurality of link elements. The chainring comprises a plurality of sprocket drive teeth having a profile corresponding to the profile of at least one of the teeth of each of the plurality of link elements.

16 Claims, 38 Drawing Sheets

(51) Int. Cl.
*F16G 13/06* (2006.01)
*F16G 13/07* (2006.01)
*B62M 9/00* (2006.01)

(58) Field of Classification Search
USPC .............. 474/157, 164, 212, 213, 215, 232
See application file for complete search history.

(56) References Cited

U.S. PATENT DOCUMENTS

| | | | | |
|---|---|---|---|---|
| 2,000,499 | A | * | 5/1935 | Roland ............... B65G 17/086 |
| | | | | 198/852 |
| 2,199,292 | A | * | 4/1940 | Pierce ..................... F16H 7/06 |
| | | | | 305/198 |
| 4,741,725 | A | * | 5/1988 | Ingold ..................... B62M 9/12 |
| | | | | 474/212 |
| 5,362,278 | A | * | 11/1994 | Bergles .................. F16G 13/04 |
| | | | | 474/69 |
| 5,423,724 | A | * | 6/1995 | Cole, Jr. .................. F16G 5/18 |
| | | | | 474/229 |
| 5,435,789 | A | * | 7/1995 | Avramidis ............. F16G 13/04 |
| | | | | 474/206 |
| 5,520,585 | A | | 5/1996 | Green et al. |
| 9,890,830 | B2 | * | 2/2018 | Wu ........................ F16G 15/00 |
| 2003/0027675 | A1 | | 2/2003 | Suzuki et al. |
| 2011/0065542 | A1 | | 3/2011 | Adachi et al. |
| 2011/0312458 | A1 | | 12/2011 | Young |
| 2015/0211603 | A1 | | 7/2015 | Koschig et al. |
| 2018/0066731 | A1 | | 3/2018 | Sato et al. |
| 2018/0223955 | A1 | | 8/2018 | Wu |

FOREIGN PATENT DOCUMENTS

| | | | | |
|---|---|---|---|---|
| DE | 94355 | C1 | 10/1896 | |
| DE | 19629604 | C1 | * 8/1997 | .............. B62M 9/10 |
| DE | 102016002683 | A1 | * 9/2017 | .............. F16G 13/04 |
| EP | 561380 | A1 | 9/1993 | |
| EP | 1120586 | A2 | 8/2001 | |
| EP | 2617501 | A1 | 7/2013 | |
| JP | S58184339 | A | 10/1983 | |

OTHER PUBLICATIONS

Combined Search and Examination Report dated Sep. 18, 2020 for GB Application No. GB2004651.2.

* cited by examiner

TOOTHED CHAIN FOR A BICYCLE

CROSS-REFERENCE TO RELATED APPLICATIONS

This application is a continuation under 35 U.S.C. § 120 of International Application No. PCT/GB2021/050790, filed Mar. 30, 2021, which claims priority to GB Application No. GB2004651.2, filed Mar. 30, 2020, under 35 U.S.C. § 119(a). Each of the above-referenced patent applications is incorporated by reference in its entirety.

BACKGROUND

Technical Field

The present disclosure relates to chains suitable for bicycles. In particular, but not exclusively, the present disclosure relates to chains suitable for bicycles comprising teeth adapted to engage with sprockets.

Background

Chains are generally used in bicycle drive systems to transfer power to the rear wheel. A crankset, comprising one or more sprockets, is rotated by a rider of the bicycle using pedals and crankarms attached to the sprockets. Sprockets included in cranksets are often referred to as chainrings. Rear wheels are generally attached to cassettes, including one or more sprockets, which are coupled to a chainring via the chain. These cassettes may be referred to as rear cassettes or sprocket cassettes. As the rider rotates the crankset, the chain transfers this rotation to the rear wheel to propel the bicycle. In examples where a sprocket cassette comprises a plurality of sprockets, a rear derailleur may be used to laterally offset the chain and cause it to shift between sprockets on the cassette. Similarly, where a crankset includes a plurality of sprockets, a front derailleur may be used to laterally offset the chain and cause it to shift between sprockets in the crankset. Sprocket cassettes may also be used in other parts of chain driven machines, for example, handcycles generally include a sprocket cassette on a front wheel.

Bicycles are generally driven by roller chains comprising a plurality of link elements comprising overlapping plates which are pivotably attached by cylindrical pin joints. The pin joints each comprise a pin, a bushing, and a roller concentrically arranged such that, when engaged with a sprocket, the roller engages with the sprocket teeth. To allow the sprockets to engage with the rollers of the cylindrical pin joints, a space is provided between the plates in which there is a recess for receiving a sprocket tooth and in which the roller is accommodated.

Roller chains have certain limitations which will become apparent from the following description. It is desirable to produce a bicycle chain which addresses at least some of these limitations.

SUMMARY

According to a first aspect of the present disclosure, there is provided a chain for a bicycle comprising a plurality of interleaved link elements, each link element of the plurality of link elements being pivotably attached to at least one other link element of the plurality of link elements and comprising at least two teeth, wherein a flank of each tooth is adapted to engage with a flank of a sprocket tooth.

Chains which comprise teeth adapted to engage with sprocket teeth can provide increased efficiency and quieter operation due to the lower contact velocities which occur during engagement of the chain with sprockets when compared to roller chains commonly used with bicycles. Known chains comprising teeth, such as inverted tooth chains, are generally used for driving conveyor systems of large machinery and as timing chains in engines. These inverted tooth chains are generally unsuitable for use with bicycles due to at least their size, the amount of articulation provided between link elements, their sensitivity to lateral alignment, and the use of guide plates to prevent dismounting of the chains.

In some embodiments, the chain is adapted to engage with sprockets having fewer than 13 teeth.

In this way, the chain is able to be used with sprockets which are smaller than sprockets generally used with chains comprising teeth such as silent chains and makes the chain more suitable for use with bicycles comprising small rear sprockets.

In some embodiments, the plurality of link elements is adapted to allow articulation of each link element with respect to an adjacent link element by at least 33 degrees in a first direction from an arrangement in which respective lengths of the link element and the adjacent link element are parallel.

In this way, the chain is capable of being used with bicycles having sprockets with eleven or fewer teeth.

In some embodiments, the plurality of link elements is adapted to allow articulation of each link element with respect to an adjacent link element by at least 54 degrees.

This allows the chain to be used with small sprockets, for example sprockets having 10 or fewer teeth, and also allows the chain to articulate in a reverse direction around jockey wheels. This may be of particular benefit when the chain is used in multi-speed bicycles comprising a derailleur having at least one jockey wheel about which the chain reversely articulates.

In some embodiments, each link element has a width of no more than 4.5 millimetres.

Providing link elements with widths of no more than 4.5 mm is possible because the chain is adapted to engage with sprockets using teeth of the link elements. Therefore, it is not necessary to provide an exposed pin joint having a roller which engages with sprocket teeth for each link element. Where the link elements are made of plate members, the widths of the chain may be approximately the width of four plates. By providing link elements having a width which is smaller than link elements of commonly used roller bicycle chains, it is possible to increase the number of sprockets which are included in the rear cassette. This may either provide an increased gear range and/or tighter gear ratios for the bicycle as compared to known bicycles or may allow the bicycle to achieve the same gear range as known bicycles and/or gear ratios while providing only a single sprocket on the chainring and hence increase the simplicity and improve the aerodynamic properties of the bicycle. In particular, gearing arrangements which may be possible using chains according to the examples described herein include, for example: increased gear ranges with the same gear spacing as known bicycles; reduced gear spacing with the same gear range as known bicycles, allowing operators to more precisely select a desired gear ratio; and the same gear range and gear spacing as known bicycles using double chainring cranksets, but with the use of only one chainring.

In some embodiments, at least a portion of a flank of each tooth is adapted to engage with a flank of a sprocket, and wherein the at least a portion of a flank of each tooth has a straight profile.

Having straight tooth flanks on the chain teeth and/or the sprocket teeth provides a larger, therefore more hard-wearing, contact area which allows the chainring sprockets and larger cassette sprockets, for example including more than 28 teeth, such as 50 teeth, to be made from generally softer materials than those which bicycle sprockets are generally made. For example, carbon composites such as carbon fibre reinforced polymer may be used. This allows the overall system to be constructed from lightweight materials.

In some embodiments, each link element comprises a first tooth located at a first end and a second tooth located at a second end, and a recess is provided in a first side between a respective first tooth and a respective second tooth, the recess being for receiving a sprocket tooth and enabling the sprocket tooth to engage with a flank of at least one of the first and second teeth and substantially maintain a relative arrangement of the chain along an axis which is substantially parallel to a rotational axis of the sprockets.

Providing a recess in the link elements as described above allows the width of the bicycle chain to be reduced while ensuring suitable engagement with sprockets. Inverted tooth chains generally comprise guide plates either located between other plate members or at an external side of the chains to maintain the relative position of the inverted tooth chains on the sprockets. These guide plates increase the width and weight of such chains and drive systems. In bicycles and other chain driven vehicles where weight and size are critical factors, being able to reduce the width of the chain while ensuring accurate alignment for chain retention, and for efficient engagement and power transfer, is particularly beneficial. Further, bicycle chains are generally narrow compared to inverted tooth chains and so the lateral position of the chain is critical to ensure the chain does not slip off of the sprockets during operation.

In some embodiments, the first tooth is laterally offset from the second tooth such that a first plane in which sprocket teeth engage with the first tooth is parallel to and offset from a second plane in which sprocket teeth engage with the second tooth.

Offsetting the first and second planes allows one to configure the chain and an accompanying drive system such that a driven sprocket engages with the first teeth of respective link elements and a drive sprocket engages with the second teeth of the respective link elements. In this way, the profiles of the first and second teeth can be adapted to accommodate the sprockets with which they engage. For example, the angle, width, and size of the teeth may all be modified and adapted during the design of the chain to provide an efficient engagement with the relevant sprocket teeth.

In some embodiments, each link element comprises a further recess on a second side of the link element opposing the first side to allow a sprocket tooth of a jockey wheel to be received in the further recess during reverse articulation of the bicycle chain around said jockey wheel.

Providing a further recess on the second side of the link element allows the chain to be guided over and maintain contact with jockey wheels in derailleurs during reverse articulation around jockey wheels.

In some embodiments, a respective first end of a first link element is pivotably attached by a pin joint to a respective second end of a second link element such that a respective first tooth of the first link element at least partially overlaps with a respective second tooth of the second link element.

By overlapping the teeth of the first and second link elements it is possible to maintain a pitch for each link element which is suitable for use in bicycle chains. As the first and second teeth of each link element are located in respective and laterally offset planes it is possible to for the first and second teeth of adjacent link elements to overlap while maintaining a suitable width and pitch for use in bicycle drive systems.

In some embodiments, the first tooth of the first link element and the second tooth of the second link element each extend away from the pin joint in a direction which is perpendicular to an axis of rotation of the pin joint, and the second tooth extends further from the pin joint than the first tooth.

Having varying sizes for the first and second teeth of each link element allows the longer teeth to extend beyond the shorter teeth and engage with sprocket teeth which the shorter teeth might otherwise prevent.

In some embodiments, each link element comprises a first end having a curved profile and a second end at which a first tooth and a second tooth are located, and wherein a recess is provided in a first side between the first end and the second end, the recess being for receiving a sprocket tooth and enabling the sprocket tooth to engage with a flank of the link element at the first end.

Providing a curved profile at a first end may allow the chain to be used with sprockets having a large range of gears whilst mitigating a potential decrease in efficiency.

In some embodiments, each link element comprises two plate members, the plate members being in contact at a respective first end of the link element and being spaced from one another at a respective second end of the link element, such that the recess is provided between the two plate members.

Constructing the link elements from plate members allows the chain to be easily manufactured and assembled.

In some embodiments, each link element comprises at least three teeth, the first tooth being formed from at least one of the two plate members at the first end of the link element, the second tooth being formed from at least one of the two plate members at the second end of the link element, and a third tooth at the second end of the link element, the third tooth being formed from the other of the two plate members.

Providing at least three teeth per link element increases the number of contact points between the chain and the sprockets and hence allows more efficient transfer of power between the sprockets and the chain. This may also increase the resistance of the chain to higher tensions as there may be a greater contact surface between the chain and the sprockets, thereby reducing the pressure, or force per unit area, on the teeth of each link element.

In some embodiments, each of the two plate members comprise at least one bend to space the two plate members at the respective second end of the link element.

This allows the link elements to be manufactured by pressing or injection moulding, pressure die casting or additive manufacturing and the bend may be adapted to allow a desired amount of articulation between link elements.

In some embodiments, at least one bend in each of the two plate members offsets a first end of the plate member from a second end of the plate member by at least a thickness of the plate member, and wherein a length of the bend is equal to or greater than the thickness of the plate member.

Providing a short bend in the plate members allows a total volume of a recess between the plate members to be increased. Consequently, more space is provided to receive guide teeth and sprocket drive teeth, hence the teeth on small sprockets can be enlarged to provide increased tensile strength. Providing a short bend in the plate members may also allow the pitch of the chain to be reduced.

In some embodiments, the first end of the first link element is located between two plate members of the second link element at the respective second end of the second link element, and wherein the respective second tooth of the second link element is coplanar with a respective second tooth of the first link element in a plane extending along the length of the link elements.

In this way, the outer surfaces of each link element are coplanar and hence the width of the chain may be reduced as compared to known bicycle chains. The distance between a bounding side of the recess and an outer side of the chain may only be the width of a single plate member.

In some embodiments, each link element is pivotably attached to at least one other link element of the plurality of link elements by a rocker pin joint.

Rocker pin joints may reduce an amount of sliding contact occurring within the pin joints during articulation of the link elements with respect to one another. This, in turn, may increase the efficiency and durability of the chain as frictional forces between components in the pin joints are reduced.

In some embodiments, each link element comprises a first aperture at one end of the link element, the first aperture being for fixedly receiving a pin member having an ovate cross section, and each link element comprises a second aperture at another end of the link element, the second aperture being for receiving the pin member having an ovate cross section, wherein a profile of the second aperture is adapted to allow the pin member to roll against an inner surface of the second aperture through at least part of a range of articulation of the link element with respect to a respective adjacent link element.

In some embodiments, a portion of the second aperture has a profile which is defined by an arc having a constant radius, such that for a part of the range of articulation of the link element with respect to the adjacent link element the pin member is adapted to concentrically slide along at least a part of the portion of the second aperture which is defined by an arc having a constant radius.

In this way, the rocker pin joint may introduce a combination of rocking and concentric sliding. By introducing a small amount of concentric sliding into the rocker pin joint, it is possible to reduce the overall size of the second aperture and thereby increase the amount of plate material and the strength in the link elements.

According to a second aspect of the present disclosure, there is provided a bicycle chainring adapted to drive a bicycle chain according to the first aspect, the bicycle chainring comprising a plurality of sprocket drive teeth, wherein each of the plurality of sprocket drive teeth have a driving flank with a profile corresponding to the profile of at least one of the teeth of each of the plurality of link elements.

According to a third aspect of the present disclosure, there is provided a bicycle chainring adapted to drive a bicycle chain according to the first aspect, wherein the bicycle chainring comprises a plurality of sprocket drive teeth for engaging with respective second teeth of the link elements of the bicycle chain to drive the bicycle chain and comprises a plurality of guide teeth, wherein each guide tooth is configured to be received in the recess in the first side and substantially maintain a relative location of the bicycle chain with respect to the chainring to allow the sprocket drive teeth to engage with and drive the respective second teeth of the link elements of the bicycle chain.

The guide teeth provided in the sprocket may provide reliable chain retention such that the chain can be efficiently driven by the drive sprocket teeth. Providing the teeth such that they are receivable within the recesses of the link elements allows the overall width of the chainring sprockets and chain system to be reduced compared to inverted tooth chains which use guide plates on the chains to ensure chain retention.

In some embodiments, the chainring comprises fewer guide teeth than sprocket drive teeth, or select guide teeth that have additional chamfers.

This may decrease the total weight of the crankset and chain drive system while also providing discrete positions of rotation at which the chain can be shifted between chainrings on the crankset. In this way, the guide teeth may simultaneously provide discrete shifting positions to enable multi-gear cranksets to be used whilst also increasing chain retention reliability.

According to a fourth aspect of the present disclosure there is provided a crankset comprising a chainring according to the second or third aspects.

In some embodiments, the crankset comprises a plurality of chainrings according to the second or third aspects described above, wherein each chainring of the plurality of chainrings comprises a different number of sprocket drive teeth to the other chainrings of the plurality of chainrings.

In this way a crankset is provided which is interoperable with the bicycle chains described above and which provides variable gear ratios which are usable by laterally shifting the chain between sprockets of the chainring.

According to a fifth aspect of the present disclosure, there is provided a sprocket cassette for being driven by a chain according to the first aspect, the sprocket cassette comprising one or more sprockets, each sprocket comprising a plurality of sprocket teeth, wherein each of the plurality of sprocket teeth have a flank with a profile corresponding to the profile of at least part of a tooth of each of the plurality of link elements.

In some embodiments, the sprocket cassette may comprise a first group of one or more sprockets adapted to be driven in a first direction by the chain and further comprising a second group of one or more sprockets adapted to be driven in a second direction, each of the second group of one or more sprockets being directly adjacent to at least one of the first group of one or more sprockets, wherein the first direction is opposite to the second direction.

In some embodiments, at least one of the first group of one or more sprockets has sprocket teeth including a first sprocket tooth profile, and at least one of the first group of one or more sprockets has sprocket teeth including a second sprocket tooth profile, wherein the first sprocket tooth profile is different to the second sprocket tooth profile.

According to a sixth aspect of the present disclosure, there is provided a bicycle chain drive system comprising: a chain according to the first aspect; a crankset according to the fourth aspect; and a sprocket cassette according to the fifth aspect.

In some embodiments the sprocket cassette comprises a plurality of sprockets, and the bicycle chain drive system comprises a derailleur to provide shifting between the plurality of sprockets of the sprocket cassette.

Further features and advantages of the present disclosure will become apparent from the following description of examples, which are made with reference to the accompanying drawings.

DETAILED DESCRIPTION

Figure 1A:
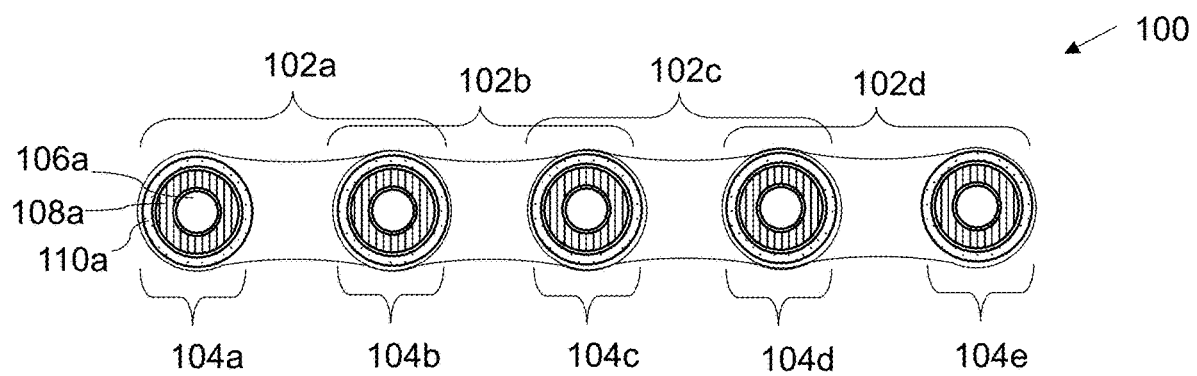
FIG. 1A is a schematic diagram of a side view of a roller chain for a bicycle.
Figure 1B:
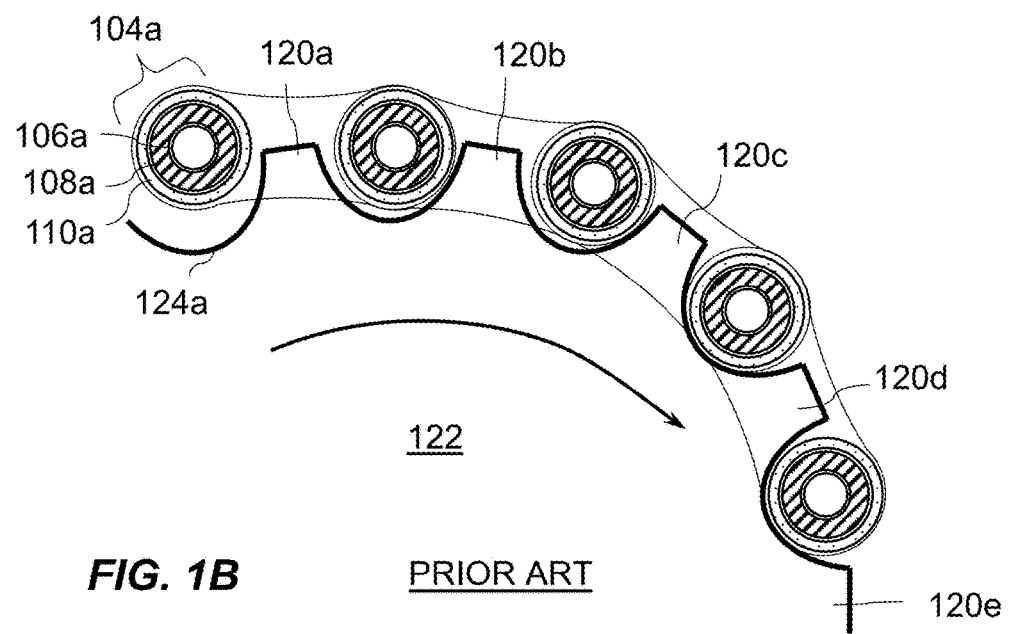
FIG. 1B is a schematic diagram of a side view of a roller chain for a bicycle engaged with a sprocket.

FIGS. 1A and 1B show part of a known roller chain 100 for a bicycle. The roller chain 100 comprises a plurality of link elements 102a to 102d. The link elements 102a to 102d are each pivotally attached to at least one other link element by a pin joint 104a to 104e comprising a pin 106a, a bushing 108a, and a roller 110a which are concentrically arranged. Only one of each of the pins, bushings, and rollers are labeled in FIG. 1A for simplicity. The roller chain 100 is configured such that the roller 110a of each pin joint engages with a sprocket tooth 120a to 120e in order to drive sprockets 122 at the rear wheel of a bicycle and to allow the chain 100 to be driven by the sprockets at the crankset of the bicycle.

FIG. 1B shows the roller chain 100 engaging with a part of a cassette sprocket 122 to drive the sprocket 122. When the pin joints 104a to 104e engage with sprocket teeth 120a to 120e the link elements 102a to 102d articulate with respect to one another causing sliding action inside each pin joint 104a. The roller 110a slides against the bushing 108a, which in turn slides against the pin 106a. Sliding action inside the pin joint 104a is a source of inefficiency as work is done in overcoming the frictional forces between the components in the pin joint 104a. For example, power input by the rider in rotating the crankset may be dissipated to overcome these frictional forces in the pin joint. Sliding action is also a source of reduced durability and effectiveness as the sliding of components against one another can accelerate the wear of said components. This mechanism of energy loss is of particular consequence in the tight span of the chain between the crankset and the rear sprockets, as the tension in the chain is greater and, consequently, the frictional forces in the chain are greater.

When engaging with sprocket teeth 120a to 120e, the roller 110a may initially contact an upper portion of the tooth 120a before settling into the saddle 124a between the sprocket teeth. To settle into the saddle 124a between sprocket teeth, the roller 110a may roll and/or slide down the flank of the tooth 120a and this may increase the amount of sliding motion inside the pin joint 104a as the bushing 108a and pin 106a slide against one another and the roller 110a. Similarly, when disengaging with the sprocket tooth 120a, the roller 110a may roll and/or slide up the flank of the sprocket tooth 120a causing a sliding action within the pin joint 104a. Roller chains 100 may also be noisy due to high contact velocities between the incoming rollers 110a and the sprocket teeth 120a. The high contact velocities which occur when using roller chains 100 are undesired as they result in energy losses.

Certain examples described herein relate to a chain and chain drive system suitable for use with chain driven vehicles such as bicycles. The chain comprises link elements having teeth which engage with sprocket teeth for driving and/or being driven by said sprocket teeth. The link elements in the chain are interleaved such that identical link elements can be used for the entirety of the chain. This is in contrast to many known roller chains generally used in bicycles which require alternating outer plates and inner plates in adjacent link elements. The chainrings described herein have sprocket drive teeth which are adapted to engage with and drive tooth flanks of the chain teeth. In some examples, the chainring also comprises guide teeth for being received in recesses in the link elements and retaining the chain on the chainring.

In certain examples, the link elements are pivotably attached and as the link elements engage with the sprockets using teeth, it is not necessary for the pin joints to engage with the sprocket teeth. Hence it is possible to reduce the width of the chains in the examples described herein as compared to known roller chains used for bicycles.

In the following examples, the chain is generally described in relation to bicycles, however, it will be appreciated that the chain, although referred to as a bicycle chain, is also suitable for other applications. Some further examples include but are not limited to, tricycles, pedal boats, pedal powered aircraft, and any other small vehicles which may utilise chain drive systems, such as electric bikes, and four wheeled electric vehicles. The chain described may also be suitable for other, non-vehicle based, drive-train applications in which there are restrictions on available space and hence where conventional silent chains may not be suitable.

Certain examples described herein relate to an inverted tooth chain for a bicycle which is directional. The term directional in this case indicates that the chain is adapted for use with a plurality of sprockets wherein the chain is driven in only one direction. To this end the geometry of the teeth and the chain is such that is it adapted to travel in one direction. By limiting the chain to being driven in one direction, it is possible to specifically adapt the teeth of the chain to engage with sprockets in a particular manner allowing geometries of the teeth of the chain to be specifically adapted to be used with certain types of sprockets, hence providing greater efficiency.

FIGS. 2A to 2F show a part of chain 200 suitable for a bicycle according to a first embodiment. Only some of the link elements shown in FIGS. 2A to 2F are labeled for clarity. However, it will be appreciated that each of the link elements shown in FIGS. 2A to 2F comprise components corresponding to those labeled. The chain 200 comprises a plurality of interleaved link elements 202a to 202c. Each link element 202a to 202c is pivotably attached to at least one other link element 202a to 202c of the plurality of link elements 202a to 202c. Where the chain 200 is in use, for example engaged with two or more sprockets 204 and 206 in a drive system, the link elements 202a to 202c may be fully connected such that each of the plurality of link elements 202a to 202c is pivotably attached to two other link elements. For example, a first link element 202b is pivotably attached to a second link element 202c at a first end 208 and to a third link element 202a at a second end 210, each link element 202a to 202c being attached in such a way that the chain 200 forms a closed loop. The link elements 202a to 202c are pivotably attached by pin joints 212a and 212b, in this example the pin joints 212a and 212b are concentric pin joints comprising at least a pin inserted through apertures in the link elements 202a to 202c. In other examples, the pin joints 212a to 212b may include bushings and/or bearings.

Each link element 202*b* of the plurality of link elements 202*a* to 202*c* comprises at least two teeth 214*b* to 216*b*, a flank 218*b* of each tooth being adapted to engage with a flank 220*a* and 220*b* of a sprocket tooth in order to transfer power between a chainring sprocket 204 and a rear sprocket 206. By providing a chain 200 which engages with the sprockets 204 and 206 using teeth 214*b* and 216*b* on the link elements 202*b* it is possible to reduce the velocities at which the chain 200 contacts the sprockets 204 and 206. A reduction in the contact velocities during engagement of the chain 200 with the teeth of the sprockets 204 and 206 provides an increase in efficiency and a reduction in noise when using the chain 200 to transfer power between two sprockets 204 and 206. Providing a chain 200, suitable for use in small and/or light weight vehicles such as bicycles, pedal boats, and in some cases small motorised vehicles, which engages with sprockets 204 and 206 using teeth 214*b* and 216*b* included in the chain 200 also allows the overall geometry of the chain 200 to be modified compared to roller chains. This can provide further benefits as will be described below.

In some examples, a flank 218*b* of a tooth 214*b* is adapted to engage with a flank 220*a* of a sprocket tooth where the profile of at least part of the flank 218*b* matches a profile of the sprocket tooth such that during engagement of the teeth 214*a* the portion of the part of the profile of the tooth 214*b* which matches the profile of the sprocket tooth contacts the sprocket tooth and provides a large contact surface through which mechanical power is transferred. In other examples an entirety of the flank 218*b* of at least some of the teeth 214*b* match and/or are adapted to engage with the sprocket teeth. In the present example, at least a portion of the flank of each tooth 214*b* and 216*b* has a straight profile. Having straight tooth flanks on the chain teeth 214*b* and 216*b* and/or the sprocket teeth provides an increased contact area and hence may be harder-wearing. This in turn allows the chainring sprockets 204, and larger rear sprockets, such as those having 28 or more teeth, to be made from generally softer materials than are commonly used in sprockets; for example, carbon fibre reinforced polymers may be used in the present example. This allows the overall system to be constructed from lightweight materials. Straight flanks also mitigate effects to the contact forces between the chain and sprockets which occur after the chain 200 has begun to stretch during use, as the pressure angle between the chain teeth 214*b* and 216*b* and the sprocket teeth remains the same. The phenomenon of chain stretching does not generally occur due to a deformation or stretch of material but rather chain stretching generally arises as material in the pin joints begins to wear and erode. As this erosion of components in the pin joints occurs, the reduction of material in these components causes the chain to lengthen. In the present example, the flanks 218*b* of the teeth 214*b* are arranged with an angle of between 50 and 70 degrees to an axis defining the length of the link element 202*b*. Angles in this range provide the desired contact pressure to increase the durability of the link elements 202*b*.

The chain 200 in the present embodiment has a width 222 of 3.7 millimetres. In other examples, the chain 200 may have a width 222 larger than 3.7 millimetres. In preferred embodiments the chain 200 has a width 222 of less than 4.5 millimetres making it narrower than known roller chains used with bicycles. Providing link elements 202*a* to 202*e* with widths of no more than 4.5 mm is possible because the chain 200 is adapted to engage with sprockets using teeth 214*b* and 216*b* of the link elements 202*a* to 202*c*. Therefore, it is not necessary to provide an exposed pin joint having a roller which engages with sprocket teeth for each link element. Where the link elements 202*a* to 202*c* are made of plate members, the widths of the chain may be approximately the width of four plates. In practice, the width of the chain 200 may be marginally larger than the width of four plate elements to provide sufficient space between the plate members 224*b* and 226*b* to allow efficient in plane and lateral articulation between the link elements 202*b* and 202*a*. Providing a chain 200 with a smaller width than known chains suitable for bicycles allows the number of sprockets which are used in the cassette to be increased, thereby allowing increased gear ranges and/or closer gear ratio cassettes to be used in bicycles without modifying the geometry and dimensions of bicycle wheels and hubs.

The chain 200 is adapted to engage with sprockets having fewer than thirteen teeth, thereby making the chain suitable for use with bicycles and other small chain driven vehicles. Bicycles may be single speed or multi-speed bicycles. A single speed bicycle is a bicycle where a single gear ratio is provided between a rear cassette sprocket and a chainring sprocket. The precise gear ratio will depend on the operator of the bicycle and the intended use. For example, where the bicycle is a single speed for cycling on flat terrain, a large gear ratio may be used such as a 50:14 tooth gear ratio provided by a 14-tooth rear cassette sprocket being used in conjunction with a 50-tooth chainring sprocket. In other examples, such as implementations where achieving high speeds is not as important, gear ratios requiring less force to rotate the chainring when traveling at a given speed may be used, such as a 42:16 tooth gear ratio provided by a 16-tooth rear cassette sprocket being using in conjunction with a 42-tooth chainring sprocket. However, multi-speed bicycles often provide a range of gears using a plurality of rear sprockets and one or more chainring sprocket. For example, many road bicycles offer cassettes having rear sprockets in a sprocket cassette with between 28 teeth and 11 teeth, and in some cases, bicycles are being provided with a largest sprocket of 50 teeth and a smallest sprocket with as few as 9 teeth. Generally inverted tooth chains are not adapted for use with sprockets having fewer than 13 teeth; this is due to the required geometries and ratios between the pitch of the link elements and the size of the teeth which would make such inverted tooth chains unsuitable for their common usages, for example heavy industrial conveyor belts and in timing chains for motors.

To allow the chain 200 to be used with cassettes with smallest sprockets having 11 or fewer teeth, the plurality of link elements 202*a* to 202*c* is adapted to allow articulation of each link element 202*b* with respect to an adjacent link element 202*c* by at least 33 degrees in a first direction 205 from an arrangement in which the respective lengths of the link element 202*b* and the adjacent link 202*c* element are parallel. In some examples, such as in known multi-speed bicycles comprising rear derailleurs for laterally shifting the chain between parallel positioned rear sprockets, bicycle chains are known to reversely articulate around jockey wheels comprised in the rear derailleurs, used to shift the chain between sprockets and to maintain tension in the chain. In order that the chain 200 may be used with derailleurs comprising upper and lower jockey wheels, the plurality of link elements 202*a* to 202*c* is adapted to allow articulation of each link element 202*b* with respect to an adjacent link element 202*c* by at least 54 degrees from an arrangement in which respective lengths of the link element 202*b* and the adjacent link element 202*c* are parallel. The total angular range of 54 degrees is the sum of the articulation in both a first direction from the parallel arrangement and in a second direction opposite the first direction. For example, the 54 degree articulation range may include around 33 degrees in a first direction and around 21 degrees in an opposite direction, such as would occur if the chain 200 were to be used with an 11 tooth rear sprocket and simultaneously with a 17 tooth upper jockey wheel in a rear derailleur. In other examples, the articulation may be greater, for example 63 degrees to allow operability with both 11 tooth rear sprockets and 12 tooth upper jockey wheels.

The link elements 202a to 202c of the chain 200 in the present embodiment comprise two plate members 224b and 226b. The plate members 224a and 226b each comprise two teeth 214b and 216b, although only the teeth 214b and 216b of a first plate member 224b are labelled in FIGS. 2A to 2F for clarity. A first tooth 216b of each plate member 224b is located at a first end 208 and a second tooth 214b is located at a second end 210, the first and second ends 208 and 210 may also be referred to as first and second ends of the link element 202b. The first tooth 216b of a plate member 224b in a first link element 202b overlaps with a respective second tooth of the second link element 202c. The first tooth 216b of the first link element 202b and the second tooth 214c of a second link element 202c which overlap, each extend away from the pin joint 212b in a direction which is perpendicular to an axis of rotation of the pin joint 212b. The second tooth 214c extends further from the pin joint 212b than the first tooth 216b. This allows both teeth 216b and 214c to engage with respective different sprocket teeth while maintaining a suitable contact area with said sprocket teeth, this will be described further below. It will be appreciated that in some examples, the teeth 216b and 214c may not extend in a direction which is exactly perpendicular but may extend in a direction which is generally perpendicular, wherein small variations from perpendicular are possible.

A recess 228b is provided in a first side of the link element 202b between the first 216b and second teeth 214b and between the plate members 224b and 226b. A further recess 230b is also provided on a second side of the link element 202b opposing the first side such that sprocket teeth of a jockey wheel may be received within the further recess 230b during reverse articulation of the chain 200 about said jockey wheel. In the example shown in FIGS. 2A to 2F, the recess 228b in the first side is connected with the recess 230b in the second side. The first side of the link element 202b is the side of the link element 202b which faces towards the rear cassette and chainring sprockets 204 and 206 during use in a chain drive system.

The plate members 224b and 226b are in contact at the first end 208 of the link element 202b and are spaced from one another at the second end 210 of the link element, such that the recess 228b is provided between the two plate members 224b and 226b. This recess 228b is suitable for receiving a sprocket tooth and enabling the sprocket tooth to engage with a flank of at least one of the first 214b and second teeth 216b. This allows the relative arrangement of the chain 200 along an axis parallel to a rotational axis of the sprocket 204 and 206 to be maintained to prevent the chain 200 from slipping off the sprocket 204 and 206. In some cases, there may be some looseness and the chain 200 may be allowed to move along this axis within a given tolerance, but the general lateral position of the chain 200 is maintained relative to the sprocket 204 and 206.

Figure 2A:
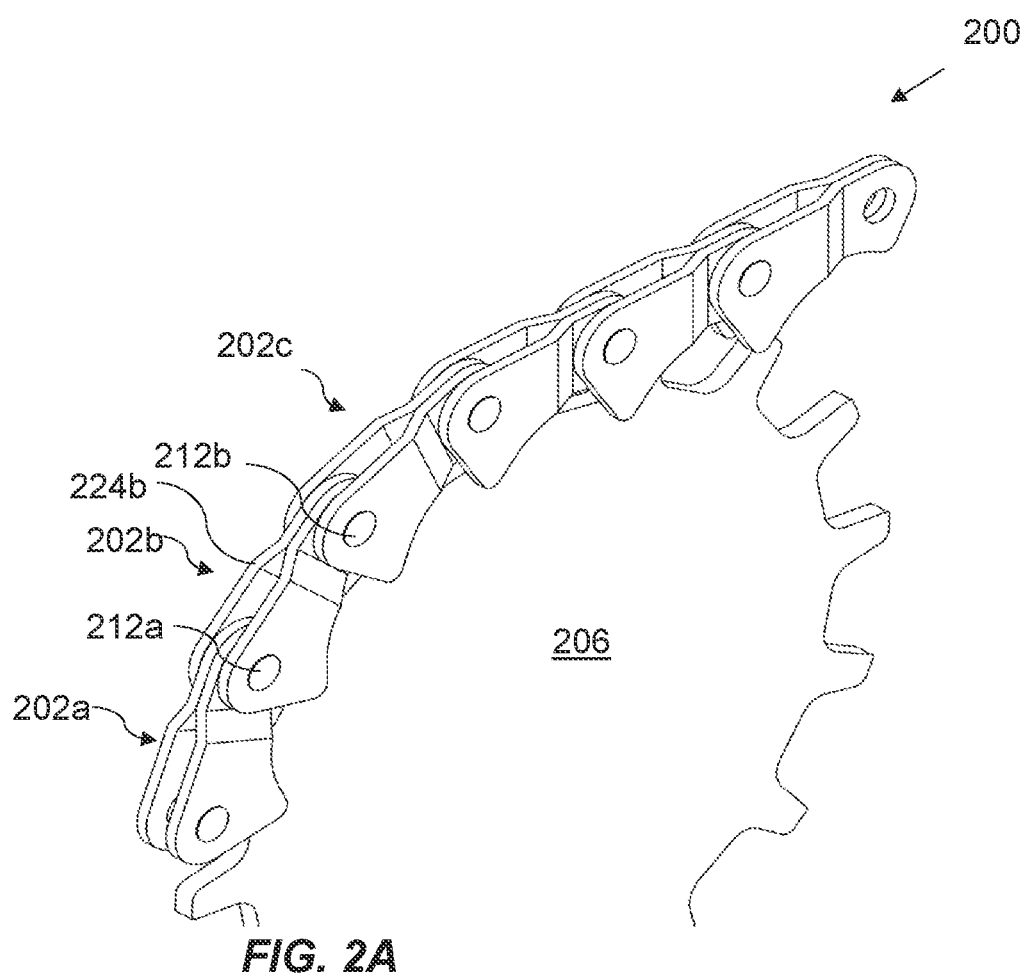
FIG. 2A is a schematic diagram of a perspective view of part of a chain for a bicycle engaged with a sprocket according to an example.
Figure 2B:
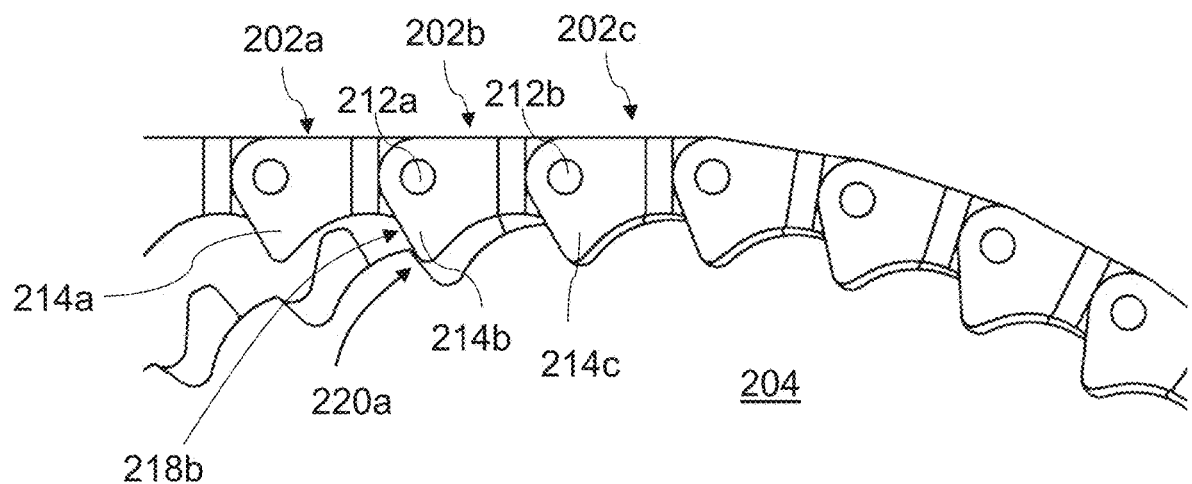
FIG. 2B is a schematic diagram showing a cropped side view of a chain engaging with a chainring of a bicycle according to the example of FIG. 2A.
Figure 2C:
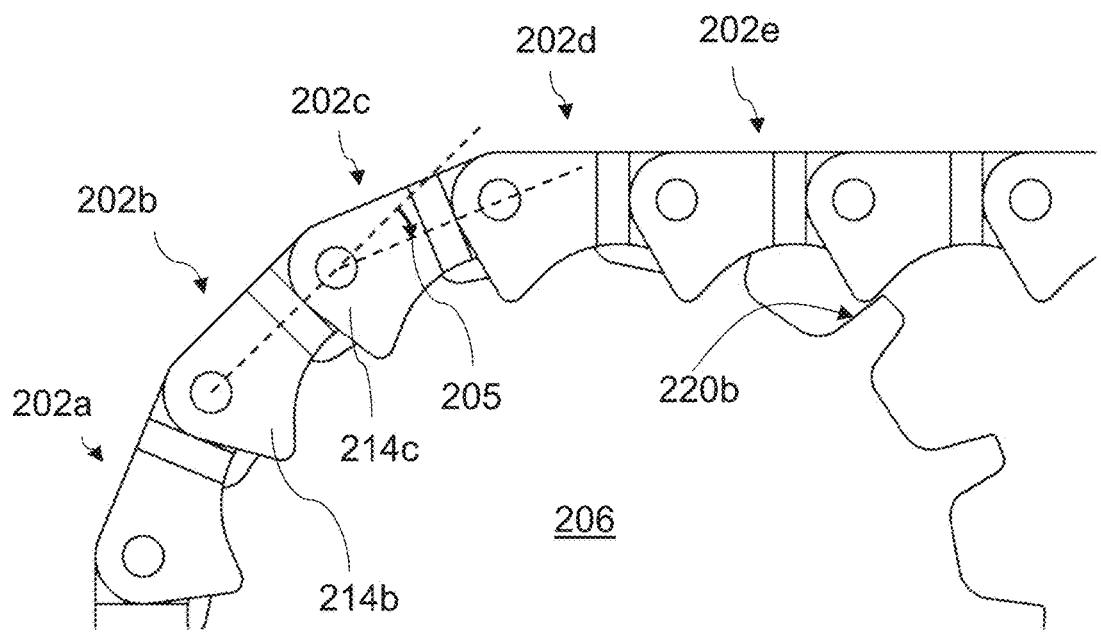
FIG. 2C is a schematic diagram showing a cropped side view of the chain engaging with a sprocket of a sprocket cassette of the bicycle according to the example of FIGS. 2A to 2B.
Figure 2D:
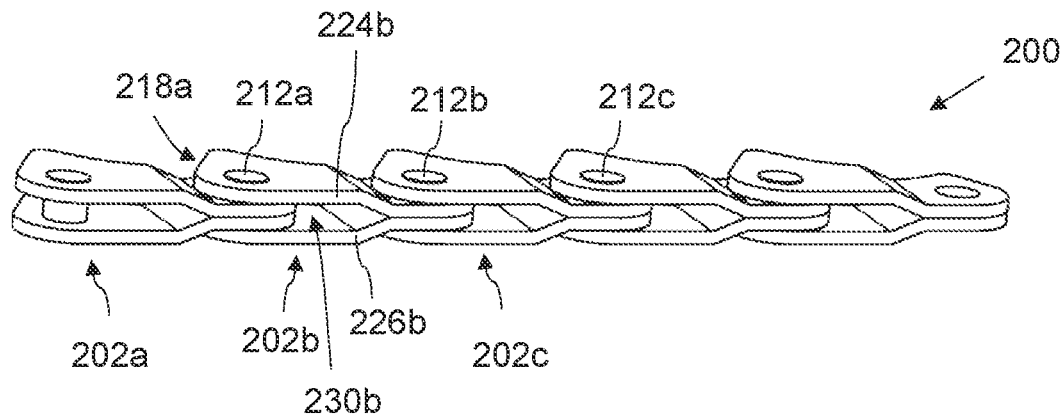
FIG. 2D is a schematic diagram showing a perspective view of the chain from a top side according to the example of FIGS. 2A to 2C.
Figure 2E:
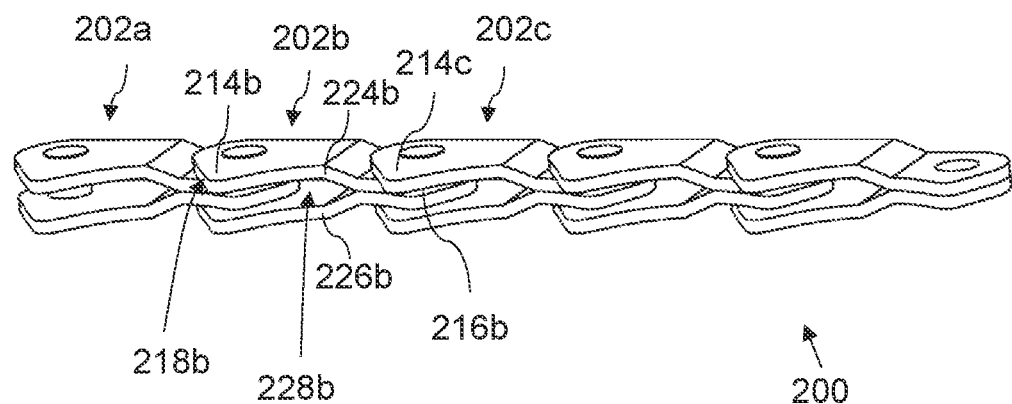
FIG. 2E is a schematic diagram showing a perspective view of the chain from a bottom side according to the example of FIGS. 2A to 2D.
Figure 2F:
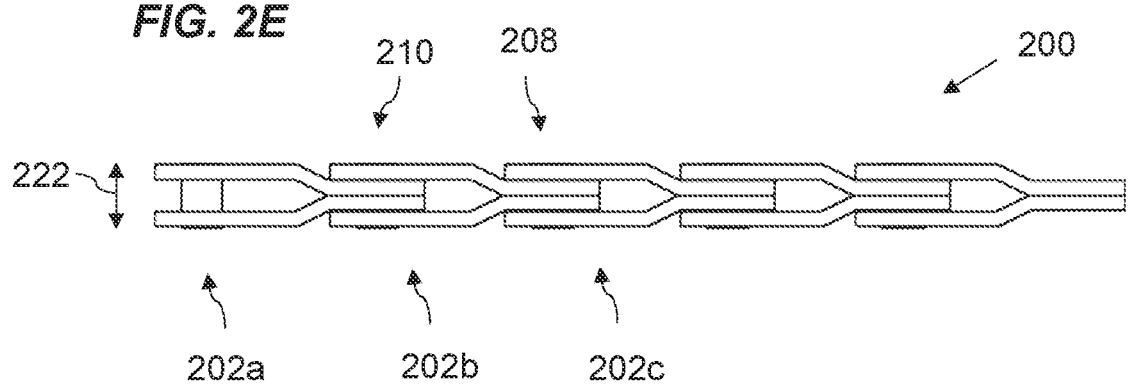
FIG. 2F is a schematic diagram showing a plan view of the chain according to the example of FIGS. 2A to 2E
Figure 2G:
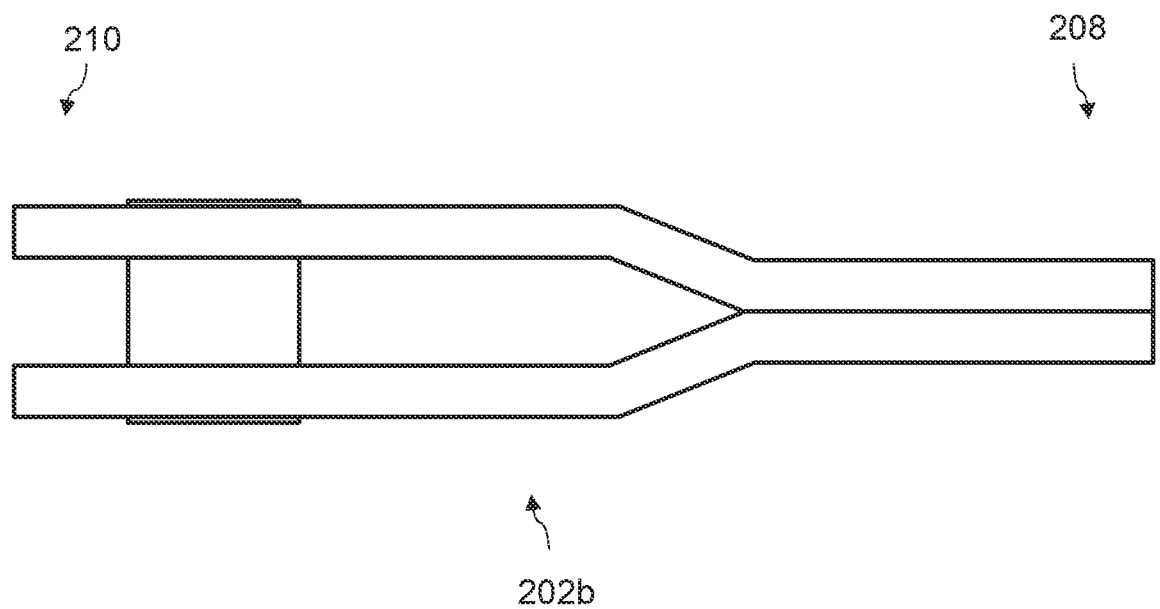
FIG. 2G is a schematic diagram showing a plan view of a link element according to the example of FIGS. 2A to 2F.
Figure 3A:
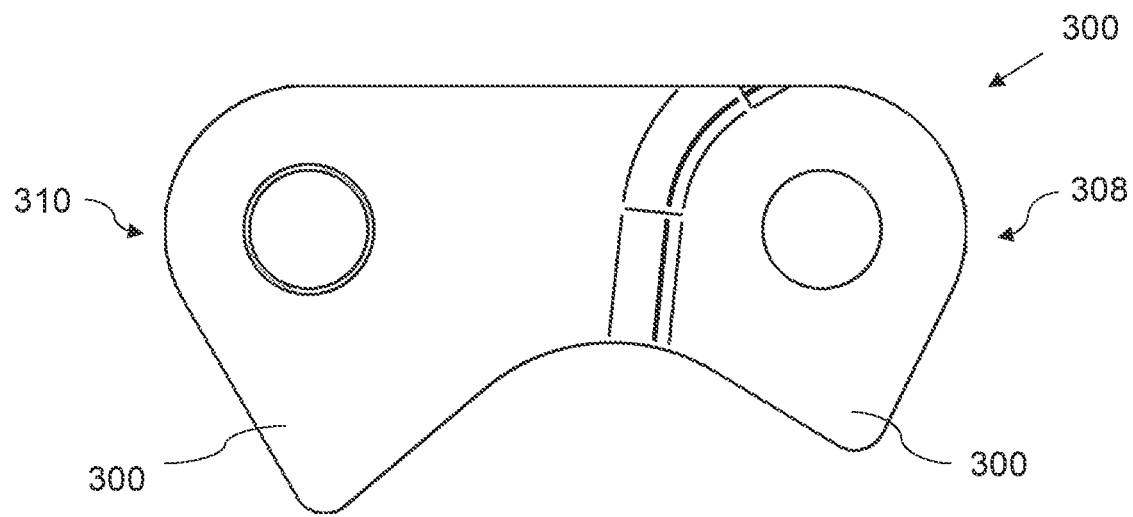
FIG. 3A is a schematic diagram showing a side view of a link element according further example of the chain.
Figure 3B:
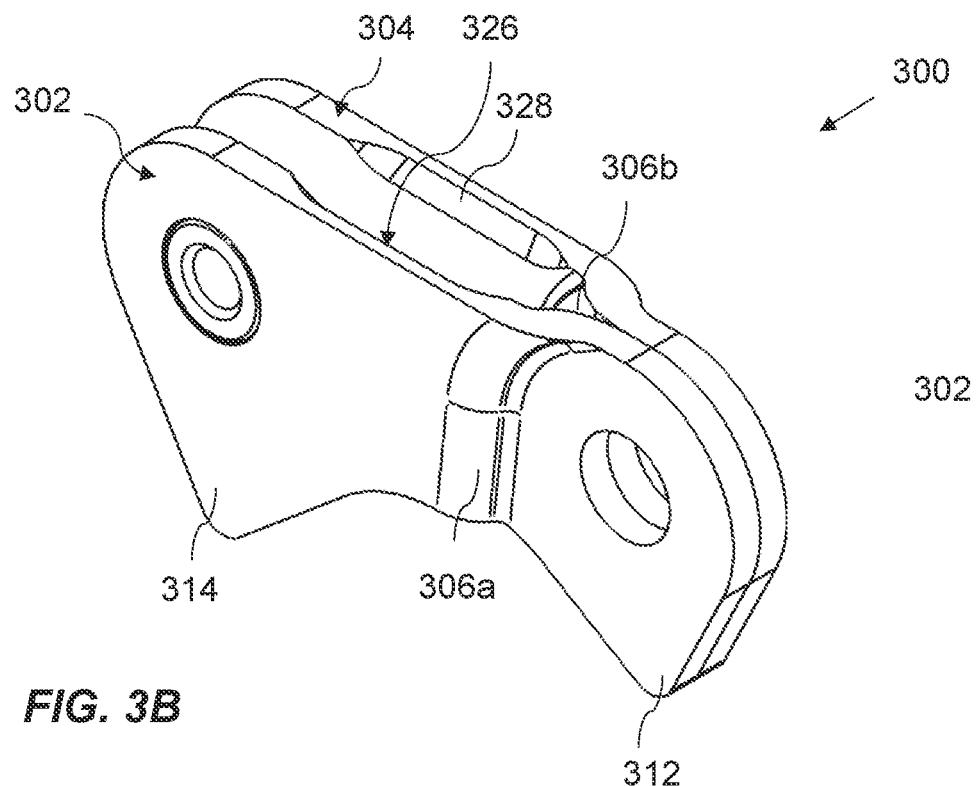
FIG. 3B is a schematic diagram showing a perspective view of the link element according to example of FIG. 3A.
Figure 3C:
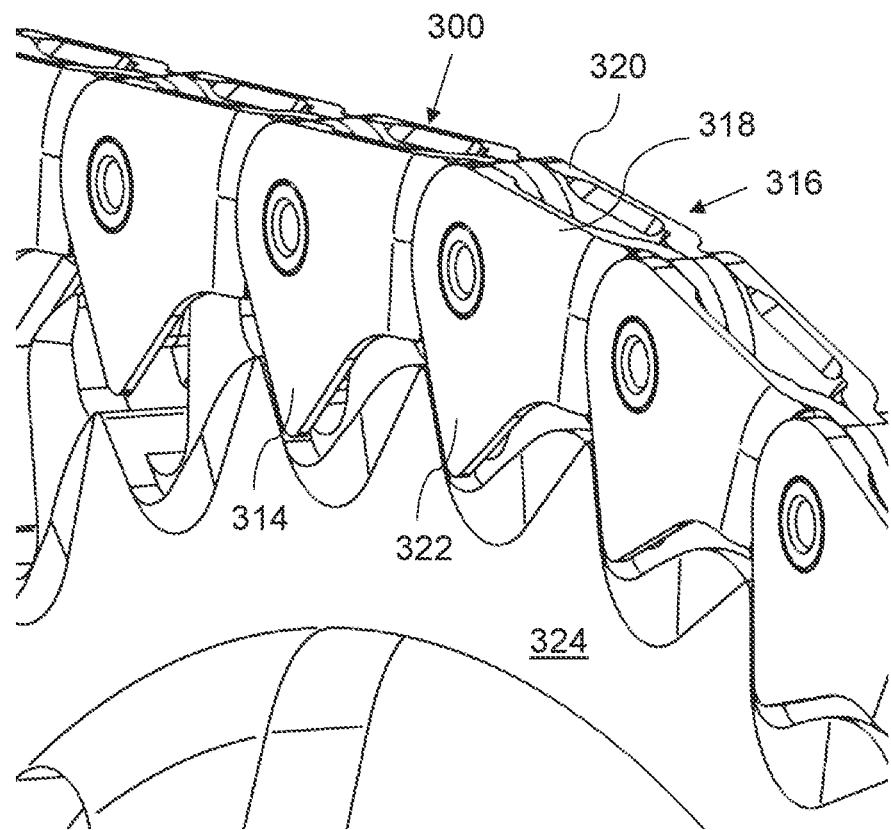
FIG. 3C is a schematic diagram showing a cropped perspective view of the chain according to the example of FIGS. 3A and 3B engaging with a chainring of a chain drive system according to an example.
Figure 3D:
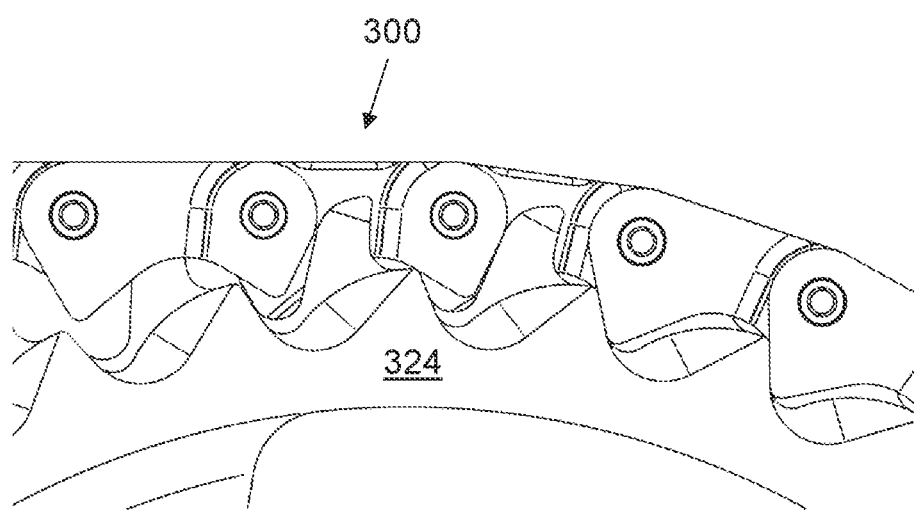
FIG. 3D is a schematic diagram showing a cropped side view of the chain according to the example of FIGS. 3A and 3B engaging with the chainring according to the example of FIG. 3C, in which two plate members are removed and a guide tooth is shown as being received within a recess in a link element.
Figure 3E:
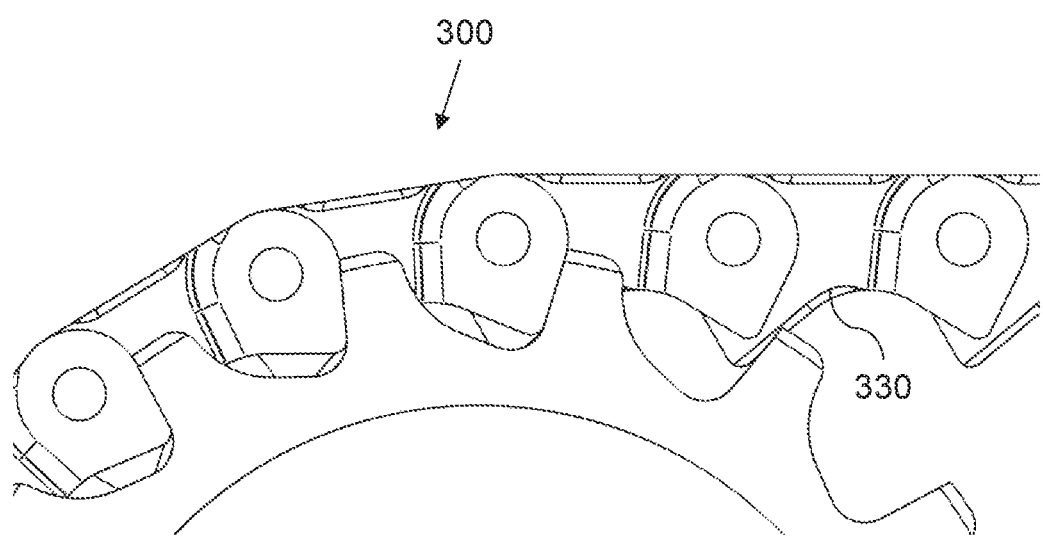
FIG. 3E is a schematic diagram showing a cropped side view of the chain according to the example of FIGS. 3A to 3D, in cross section.
Figure 4A:
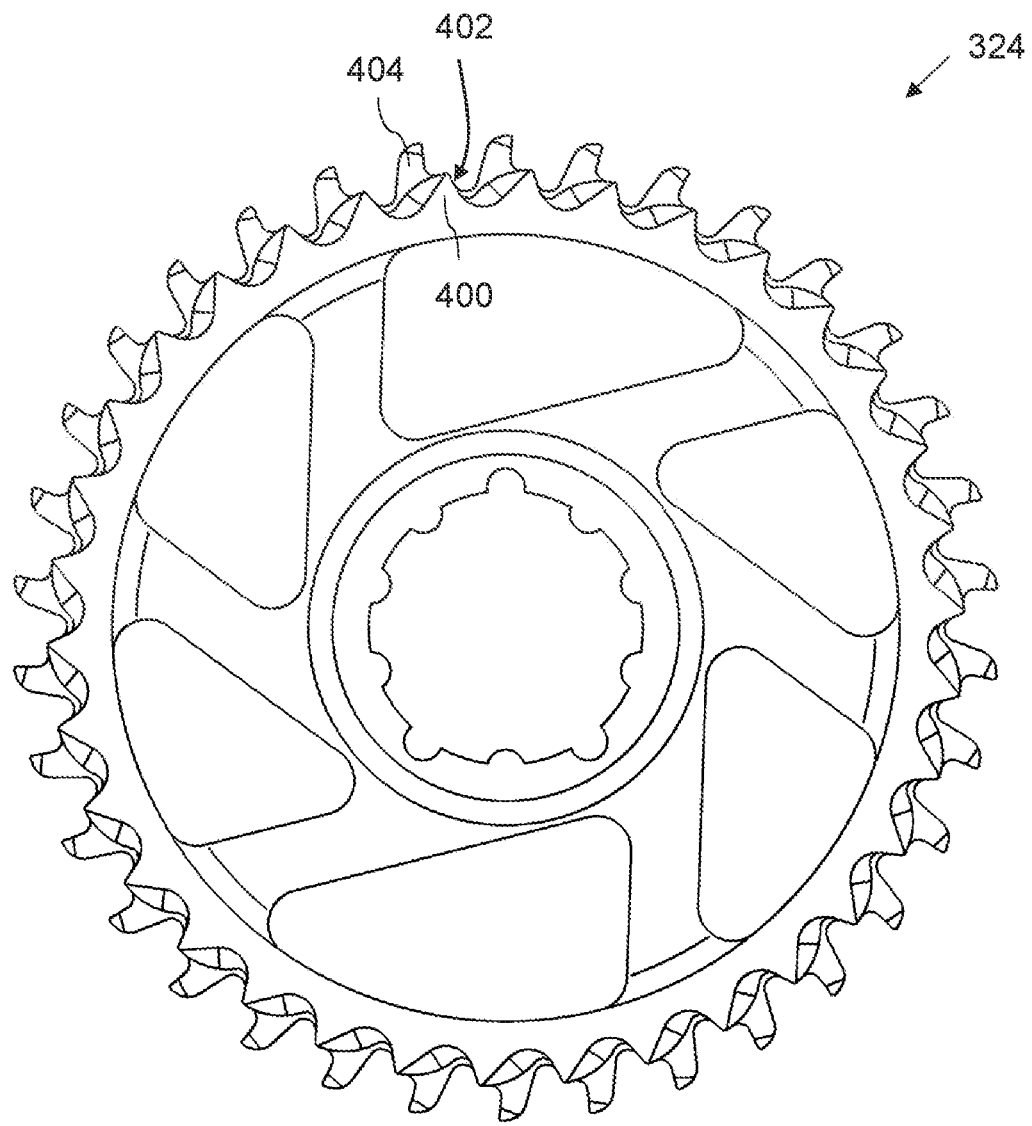
FIG. 4A is a schematic diagram showing a side view of a chainring according to an example.
Figure 4B:
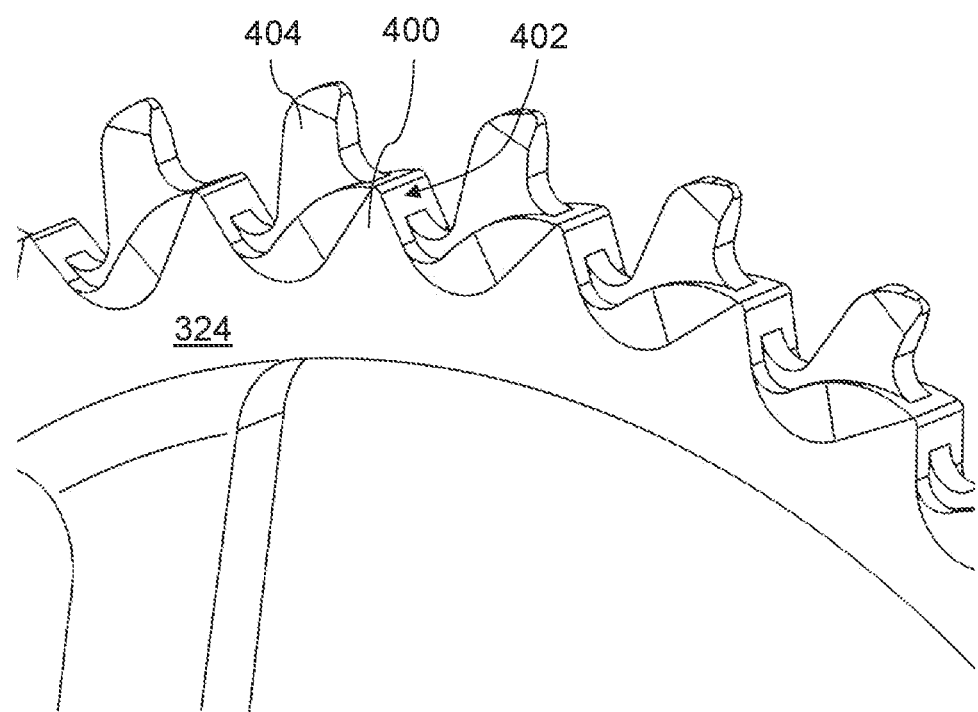
FIG. 4B is a schematic diagram showing a cropped perspective view of the chainring according to the example of FIG. 4A.

In the example shown in FIGS. 2A to 2F, the two plate members 224b and 226b each comprise a respective second tooth 214b at the second end 210 which extends further from the pin joint 212b than the tooth located at the first end of the adjacent link element 202a. In this way, and as can be seen in FIGS. 2A and 2C, these respective second teeth 214b extend either side of the rear sprocket 206 past the sprocket teeth when the chain is engaged with the sprocket 206. This increases the chain retention when engaged with the rear sprockets 206 beyond that which would be provided if only the sprocket teeth overlapped with the chain 200.

As the teeth 216b of the chain 200 with which the sprocket teeth engage are formed from the plate members 224b and 226b, the plate members 224b and 226b can be in contact at the first end 208 without the pin joints 212b being exposed to environmental conditions. This may increase the durability and reduce the wear which may occur during use of the chain 200. To increase the resistance to torsional stresses when in use and provide resilience to environmental corrosion, the plate members 224b and 226b may be fused together, or integrally formed, at the first end 208.

The first tooth 216b of each plate member is laterally offset from the second tooth 214b such that a first plane in which the sprocket teeth engage with the first tooth 216b is parallel to and offset from a second plane in which the sprocket teeth engage with second tooth 214b. In this way the teeth 216b located at the first end 208 of the link element 202b are capable of engaging with sprockets 206 in a different plane to the teeth 214b located at the second end 210 of the link element 202b. This offset is provided in the embodiment shown in FIG. 2A to 2F by the plate members 224b and 226b each being curved, or bent, along a length of the plate members 224a to 224e and 226a to 226b.

By having the first teeth 216b of each plate member 224b offset from the second teeth 214b of each plate member 224b such that the teeth 216b at the first end 208 of a link element 202b are both offset from the teeth 214b at the second end 210 of the link element 202b allow different sprockets to engage with the front 216b and rear teeth 214b of each link element 202b. This allows the profile of each of the teeth 214b and 216b to be specifically adapted for use with a certain sprocket. For example, the teeth 214b located at the second end 210 of each link element 202b are adapted to engage with the chainring sprocket 204 and have straight flanks 218b which are longer than the teeth 216b at the first end 208 of each link element 202b which are adapted to engage with rear sprockets 206. This is because the chainring sprockets 204 are usually larger, for example more than 28 teeth, and the variation between two parallel chainring sprockets is not as drastic as the difference between the largest and smallest sprockets of the rear cassettes which may have for example, a range of up to 50 teeth to 9 teeth.

FIGS. 3A to 3E show an alternative embodiment of a link element 300 for a chain according to examples. In the example of FIG. 3 the spacing between the two plate members 302 and 304 of the link element 300 is provided by two bends 306a and 306b, which may also be referred to as a crank, in each of the plate members 302 and 304 which is shorter than the bend in the example FIG. 2A to 2F. Using a short bend in the plate members 302 and 304 may simplify the manufacture of the plate members 302 and 304 and allow them to be more readily manufactured using pressing techniques. The plate members 302 and 304 are spaced at the second end 310 of the link element 300 by at least a width equal to the width of both plate members 302 and 304 at a first end 308 to allow a first end 308 of a further link element to be received within the second end 310 of the link element 300. The local thickness of the plate members 302 and 304 may vary along the length of the link element, such that the thickness of a plate member 302 or 304 at a first end 308 does not necessarily equal the thickness of a plate member 302 or 304 at a second end 310.

To this end, the bend 306a in each of the plate members 302 and 304 offsets the inner face of the first tooth 312 from the inner face of the second tooth 314 by at least a thickness of the plate member 302 at a first end 308. A length of the bend 306a, defined along the length of the plate member 302 and the link element 300, is equal to 1.2 millimetres. In preferred embodiments, the length of the bend 306a is equal to or greater than the thickness of the plate member 302. The precise length and geometry of the bend 306a will depend on the specific implementation including the length of the teeth 312 and 314 on the chain and the desired articulation between link elements. In alternative embodiments, not shown here, only one of the plate members 302 or 304 comprises a bend. For example, each link element 300 may comprise a first plate member 302 which is parallel to a length of the chain and a second plate member 304 which comprises one or more bends to separate a second end 310 of the second plate member 304 from a corresponding end 310 of the first plate member 302. In examples such as these, the bend in the second plate member 304 may be greater than either of the bends 306a and 306b shown in FIGS. 3A to 3E, for example twice as large.

The first end 308 of a first link element 300 in the present embodiment is located between the two plate members 318 and 320 of a second link element 316 at a respective second end of the second link element 316. A second tooth 322 of the second link element 316 is coplanar with the second tooth 314 of the first link element 300 in a plane extending along the length of the link elements 300 and 316. This allows the chain to reliably engage with the chainring 324 at each link element 300 and 316.

In the embodiment shown in FIGS. 3A to 3E, the plate members 302 and 304 comprise chamfers 326, 328, and 330 which allow sprocket teeth to more reliably engage with the chain even where small modulations occur during use and the chain becomes laterally offset from the sprockets before engaging with the sprockets. The plate members 302 and 304 comprise chamfers 326 and 328 which allow upper jockey wheel teeth to more reliably engage with the chain, and chamfers 330 on the first side of the link element 300 which allow sprocket teeth to more reliably engage with the chain. Only one chamfer 330 on the first side of a plate member is shown, although it will be appreciated that such chamfers 330 may be present on both plate members of each link element.

In FIGS. 3C, 3D, 4A, and 4B a chainring 324 adapted to drive a chain according to the examples described above is shown. The chainring 324 has a plurality of sprocket drive teeth 400, each having a driving flank 402 with a profile corresponding to the profile of the teeth 314 located at the second end 310 of each of the plurality of link elements 300.

The chainring 324 also comprises a plurality of guide teeth 404. The guide teeth 404 are configured to be received in the recesses in the respective first sides of the link elements 300 between the teeth 314 and 312. The guide teeth 404 substantially maintain a relative location of the chain with respect to the chainring 324 to allow the sprocket drive teeth 400 to engage with and drive the respective second teeth 314 of the link elements 300 of the chain. In the example shown, the chainring 324 comprises a guide tooth 404 at each of the sprocket drive teeth 400. The guide teeth 404 extend from a middle of each of the sprocket drive teeth 400. This ensures reliability and secure engagement between the chain and the chainring 324. However, in alternative examples the chainring 324 may comprise fewer guide teeth 404 than shown, in other words, the chainring 324 may comprise fewer guide teeth 404 than sprocket drive teeth 400. This may reduce the weight of the chainring 324 while still providing chain retention in a suitable range of use cases. The specific implementation of the chain and chainring 324 may influence the number of guide teeth 404 provided on the chainring 324. For example, where the chain and chainring 324 are to be used on a mountain bike, a large number of guide teeth 404 may be provided as vibrations caused during mountain biking may laterally offset the chain from the chainring 324 more than during cycling on roads. In other examples, there may be one guide tooth 404 for every two or three sprocket drive teeth 400. Having gaps between adjacent guide teeth 404 may be suitable in applications where the chainring 324 is included in a multi-chainring crankset, and the chain is to be shifted between the chainrings during use. The gaps between adjacent guide teeth 404 would provide suitable positions at which the chain could be more readily shifted between the chainrings 324. In this example, the remaining guide teeth 404 may be modified by the inclusion or alteration of chamfers, or otherwise, to aid in the shifting of the chain between chainrings.

In some known bicycles having cranksets with one chainring and no front derailleur, the sprocket teeth on the chainring may alternate between thicker and thinner tooth profiles in order to more securely fit within the link elements of known roller chains, having inner and outer link elements, and thereby increase chain retention. However, in this case chainrings are constrained to having an even number of teeth. Providing chain retention with guide teeth as in the present example allows the chainrings to have any suitable number of guide teeth 404 and drive teeth 400, thereby allowing the chainring to be adapted to provide a more suitable gear ratio. In addition to this, replacement of the chain on the chainring 324, in the event of disengagement either by laterally shifting between chainrings or due to general disengagement of the chain, is simplified due to the continuity of possible position that the chain can take on the chainring 324.

Figure 5A:
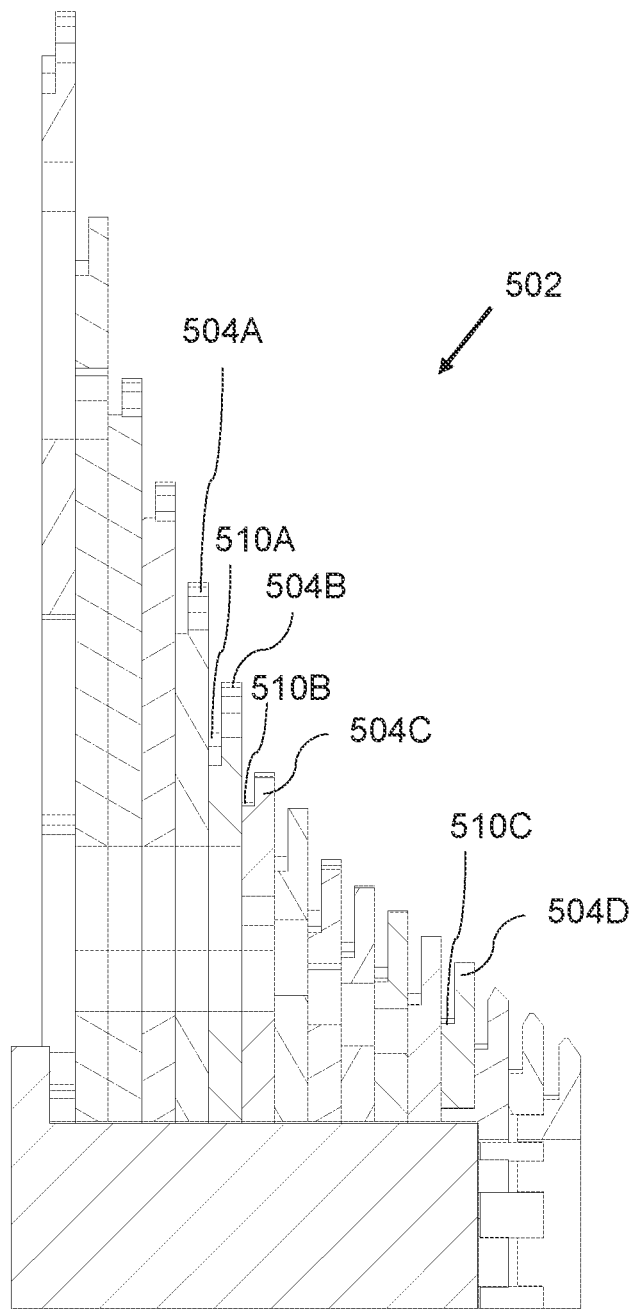
FIG. 5A is a schematic diagram showing a cross section of part of a sprocket cassette, according to examples.
Figure 5B:
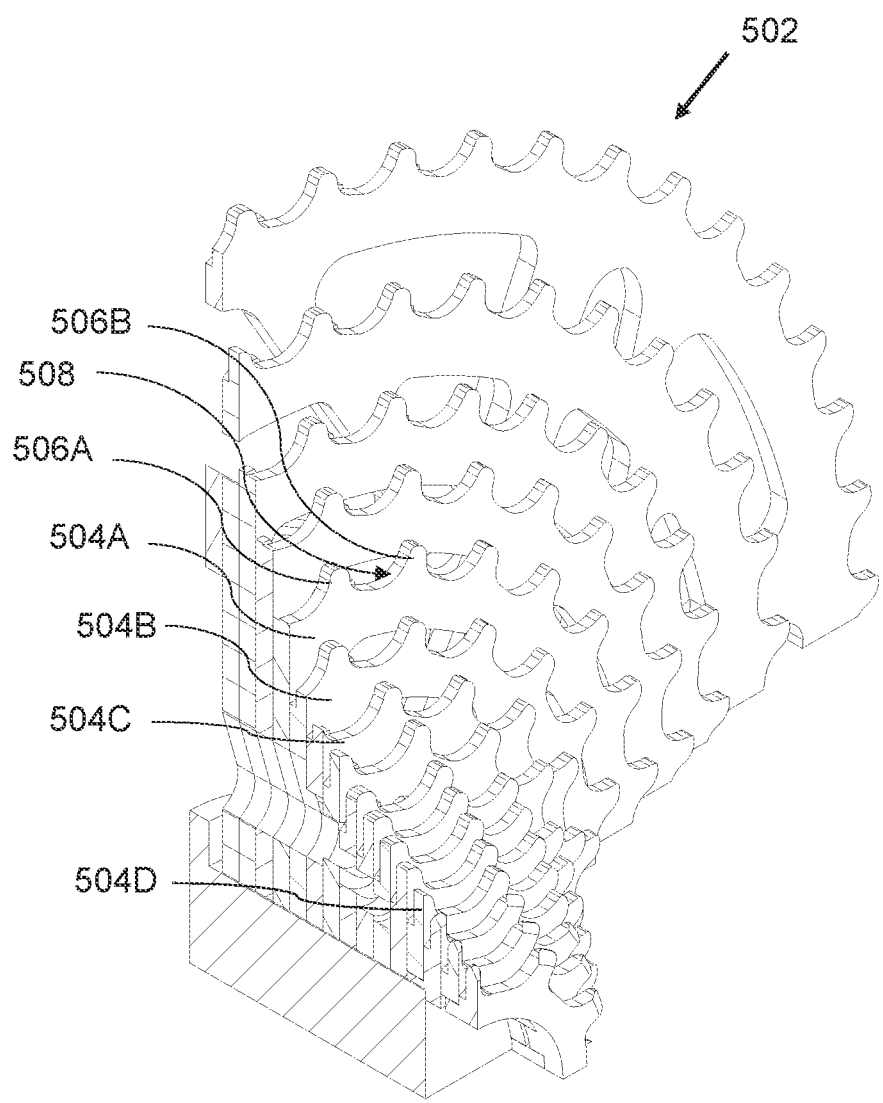
FIG. 5B is a schematic diagram showing a cross section of a part of a sprocket cassette in a perspective view, according to examples.

FIGS. 5A and 5B show part of a sprocket cassette 502 in cross section according to examples. The sprocket cassette 502 comprises a first group of one or more sprockets 504A to 504D suitable for being driven in a first direction by a chain according to the examples described above. The first group of one or more sprockets 504A to 504D are adapted to engage with a leading edge, for example, an edge at a first end 308 of a link element 300 of a chain. This allows the first group of one or more sprockets 504A to 504D to be driven in a first direction when a load is applied to the sprockets 504A to 504D by the link elements 300 in the chain. A sprocket cassette 502 is used here to describe a freewheel or cassette comprising one or more sprockets. The sprocket cassette 502 shown comprises a plurality of sprockets 504A to 504D, wherein each sprocket comprises a plurality of sprocket teeth 506A, 506B. Each of the sprocket teeth have a flank 508 with a profile which corresponds to a profile of at least part of a tooth 312 of each of the plurality of link elements 300. A profile of a flank 508 of each of the sprocket teeth, which is to be loaded when the chain is driving a said sprocket 504A, is adapted to engage with a leading flank of a first tooth 312 of a link element 300. In some examples, a profile of a flank 508 of each of the sprocket teeth may be adapted to engage with a leading flank of a first tooth 312 by matching the shape of the profile of the flank 508 of the sprocket tooth with a profile of the leading flank of a first tooth 312.

The sprocket cassette 502 shown in FIGS. 5A and 5B, also comprises a second group of one or more sprockets 510A to 510C, each sprocket 510A to 510C of the second group of sprockets being directly adjacent to at least one of the first group of one or more sprockets 504A to 504D. In the example shown in FIGS. 5A and 5B, the majority of the second group of sprockets 510A to 510C are disposed between respective adjacent sprockets 504A to 504D in the sprocket cassette 502. The second group of one or more sprockets are each adapted for being driven in a second direction which is opposite to the first direction. In particular, the sprocket teeth of the sprockets in the second group of sprockets 510A to 510C are adapted to engage with different teeth 314 of the link elements 300 than the teeth 312 which the first group of one or more sprockets 504A to 504D are adapted to engage with. While it has been stated that the sprockets in the first group of one or more sprockets 504A to 504D and the second group of one or more sprockets 510A to 510C have been described as engaging with different teeth of a link element 300, it will be apparent to the skilled person that teeth may be used in this context to refer to any surface of a link element 300 which is adapted to transmit a load to a sprocket. For example, in the example described below with respect to FIGS. 7A to 7D, a rounded or curved edge, without a tooth, may be used at a first end of a link element to transmit a load to a sprocket.

Figure 5C:
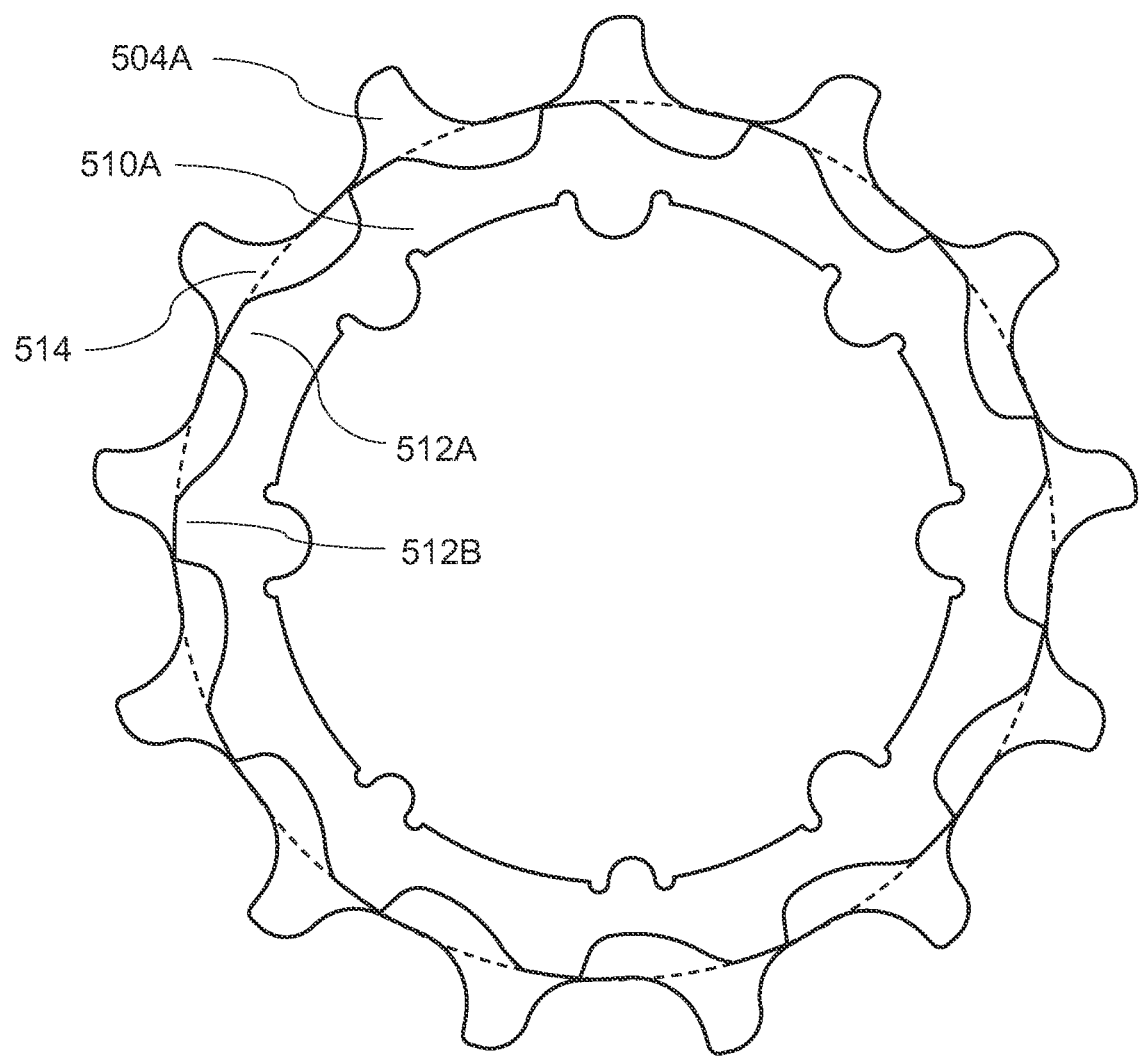
FIG. 5C is a schematic diagram showing a sprocket of the sprocket cassette in a side view.
Figure 5D:
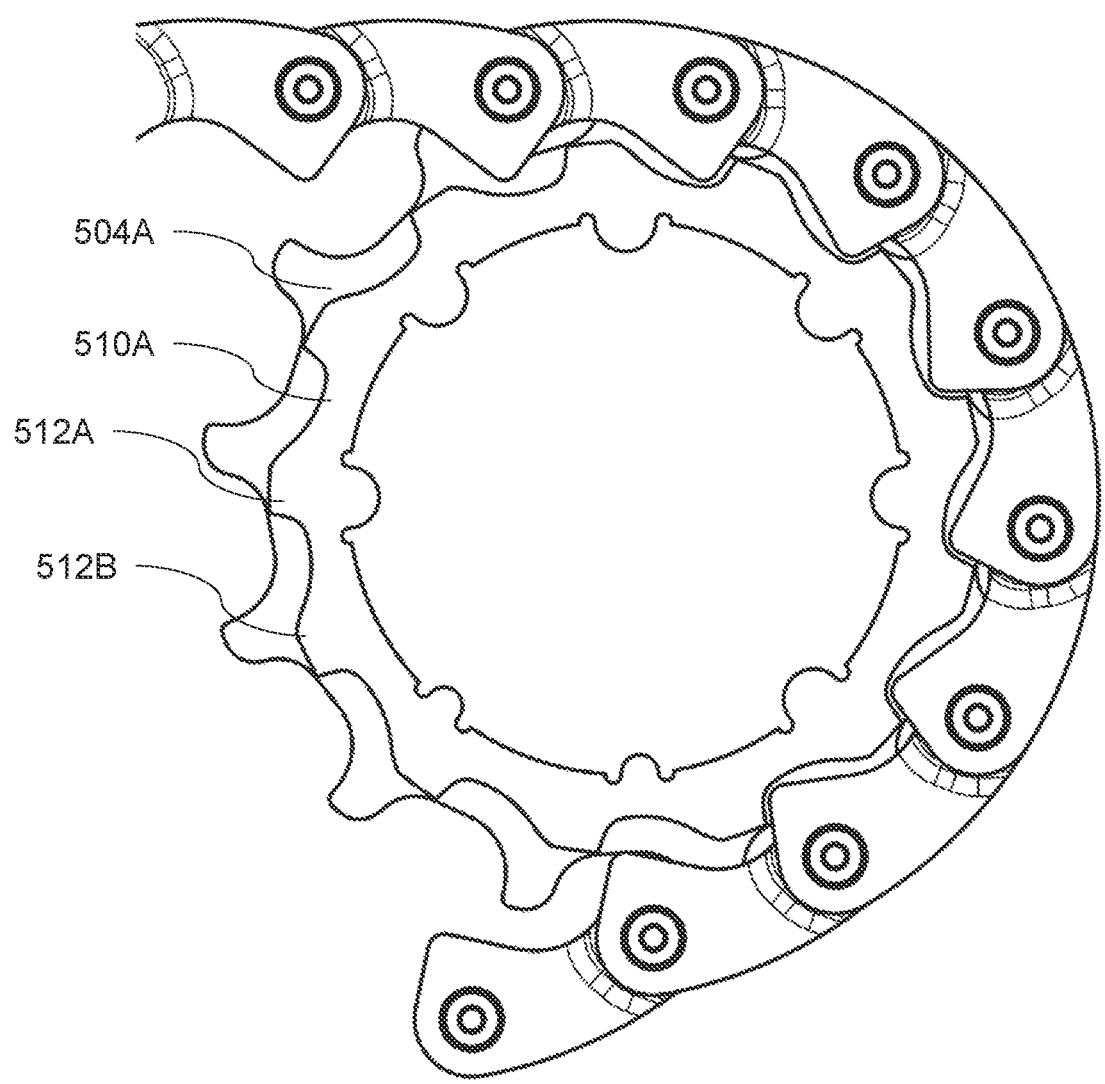
FIG. 5D is a schematic diagram of the sprocket of the sprocket cassette engaged with a chain, according to examples.

FIGS. 5C and 5D both show a side view of a sprocket 504D with an adjacent sprocket 510C of the second group of sprockets. The sprockets 510A to 510C of the second group each comprise a plurality of teeth 512A, 512B adapted to engage with a flank of a tooth of each of the plurality of link elements 300. In this case, the teeth 512A and 512B of the sprockets 510A to 510C of the second group are adapted to engage with the flank of respective second teeth 314 of each of the plurality of link elements 300. By providing the second group of sprockets 510A to 510C which are adapted to engage with respective second teeth 314 of each of the plurality of link elements 300 to be driven, or carry a load in a second direction which is opposite the first direction, a mechanism for transmitting load to the sprocket cassette 502 in reverse is provided. This allows back-pedaling, when used as part of a pedal driven vehicle, and engagement. Further, where a sprocket cassette 502 comprising a plurality of sprockets 504A to 504D is used in combination with a device, e.g. a derailleur, for laterally shifting the chain between sprockets, it is possible for tension to be maintained on a slack side of chain without compromising the engagement of the chain with a sprocket 504A of the sprocket cassette 502. While a sprocket cassette 502 comprising a plurality of sprockets in the first group of sprockets 504A to 504D has been shown, it will be appreciated that a sprocket cassette 502 may have just one sprocket 504A in the first group of sprockets and one or more sprockets 510A in the second group of sprockets. In this way, the sprocket cassette may be used in a single speed or fixed gear bicycle.

In the example shown, the second group of sprockets 510A, to 510C are integrally formed as part of the sprockets 504B, 504C, and 504D respectively, however, it will be appreciated that alternatives are possible, for example, the second group of sprockets 510A to 510C may be constructed separately from and positioned between adjacent sprockets 504A to 504D of the first group of sprockets. The second group of sprockets 510A to 510C may be made of the same or different materials to the first group of sprockets 504A to 504D in the sprocket cassette 502. For example, in some examples, the second group of sprockets 510A to 510C may not be required to bear a load as high as the load which is to be received by the first group of sprockets, and hence lighter and less durable materials may be used to construct the second groups of sprockets 510A to 510C as compared to the first group of sprockets 504A to 504D.

The maximum diameter 514 of each of the second group of sprockets 510A may be determined by one of two potential measurements. In some cases, the maximum diameter 514 of a sprocket 510A of the second group of sprockets which is disposed between two adjacent sprockets 504A and 504B of the first group is determined by a minimum wrap diameter for the larger sprocket 504A of the two adjacent sprockets 504A and 504B of the first group. The minimum wrap diameter for the smallest sprocket in a sprocket cassette 502, for example, a nine-toothed sprocket, may be around 25.5 mm and is determined by the requirements of the use for the sprocket cassette. For example, where the sprocket cassette is a sprocket cassette or a freehub for a bicycle, the minimum wrap diameter must be large enough to accommodate an axle, a hub end cap, space for a lock-ring tool, a cassette lock-ring and material to connect the smallest sprocket to the rest of the cassette/freehub concentrically in this space. The minimum wrap diameter is the diameter of a circle which is defined as the tangent to the path traced by a second tooth 314 of link element 300 when the link element 300 articulates around the sprocket 504A.

The maximum diameter of a sprocket of the second group of sprockets 510B which is disposed between adjacent sprockets having a small difference in the number of teeth, for example, smaller sprockets for bicycle cassettes, e.g. nine, ten, eleven, and twelve teeth sprockets which differ in number of teeth between adjacent sprockets by one, has been found to be determined by the minimum wrap diameter of the larger of the two sprockets of the first group of sprockets to which the sprocket in the second group is adjacent.

In other cases, the maximum diameter of the sprocket 510A in the second group of sprockets may be determined by a limit of the link crotch height, wherein the link crotch height is defined as the height of the arch between the first end 308 of the link element 300 and the second end 310 of the link element 300.

FIGS. 6A to 6D show an alternative embodiment of a link element 600 for a chain 200 according to examples. The link element 600 comprises a first tooth 602 at a first end 604 a second tooth 606 at a second end 608. In the example of FIGS. 6A to 6D, the first end 604 of the link element 600 comprises a flank profile which is adapted to engage the flanks of sprocket teeth to drive the sprocket teeth, wherein a first portion 610 of the profile of the first end 604 comprises a straight flank, or the first tooth 602, and a second adjacent portion 612 of the profile of the first end 604 comprises a curved profile, similar to the flank profile of a roller in a roller chain. In the example shown the profile of the first end 604 is circular, although other curved profiles, such as ellipses may be used. By providing a profile for engaging with sprocket teeth which has a combination of a curved profile and a straight flank, or tooth 602, it is possible to increase the contact area on smaller sprockets, for example, sprockets having between 9 and 14 teeth, and also larger sprockets at low loads.

Figure 6A:
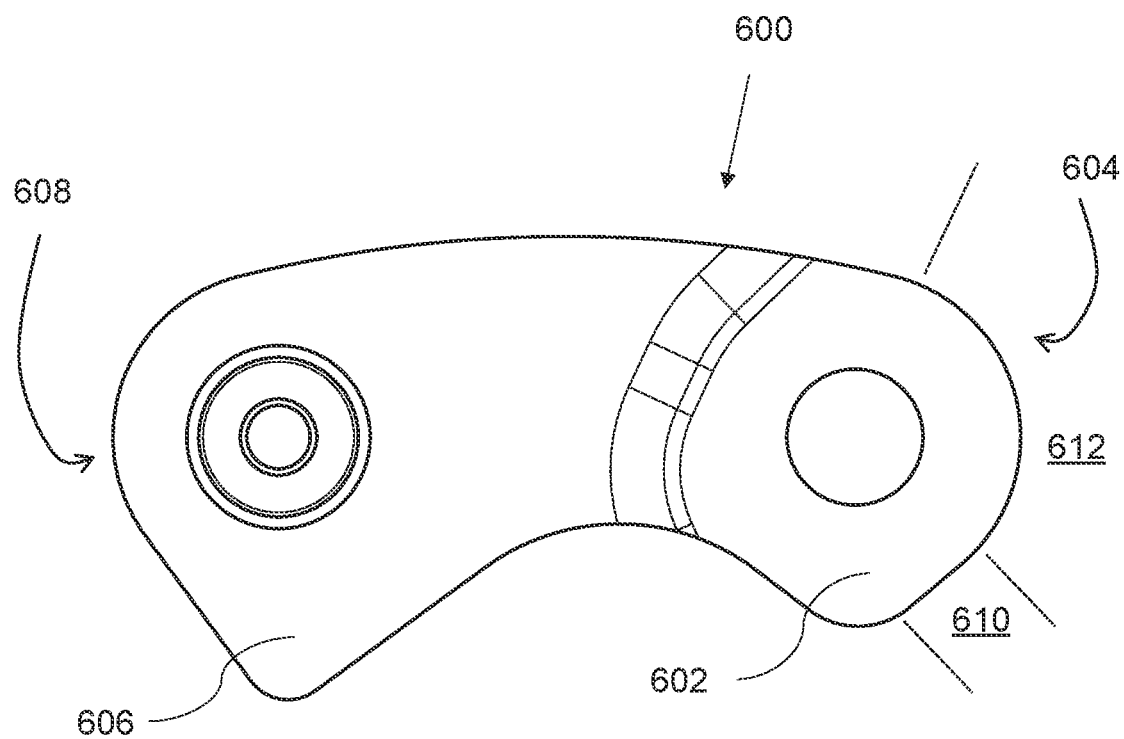
FIG. 6A is a schematic diagram showing an example of a link element in a side view comprising a link element according to examples.
Figure 6B:
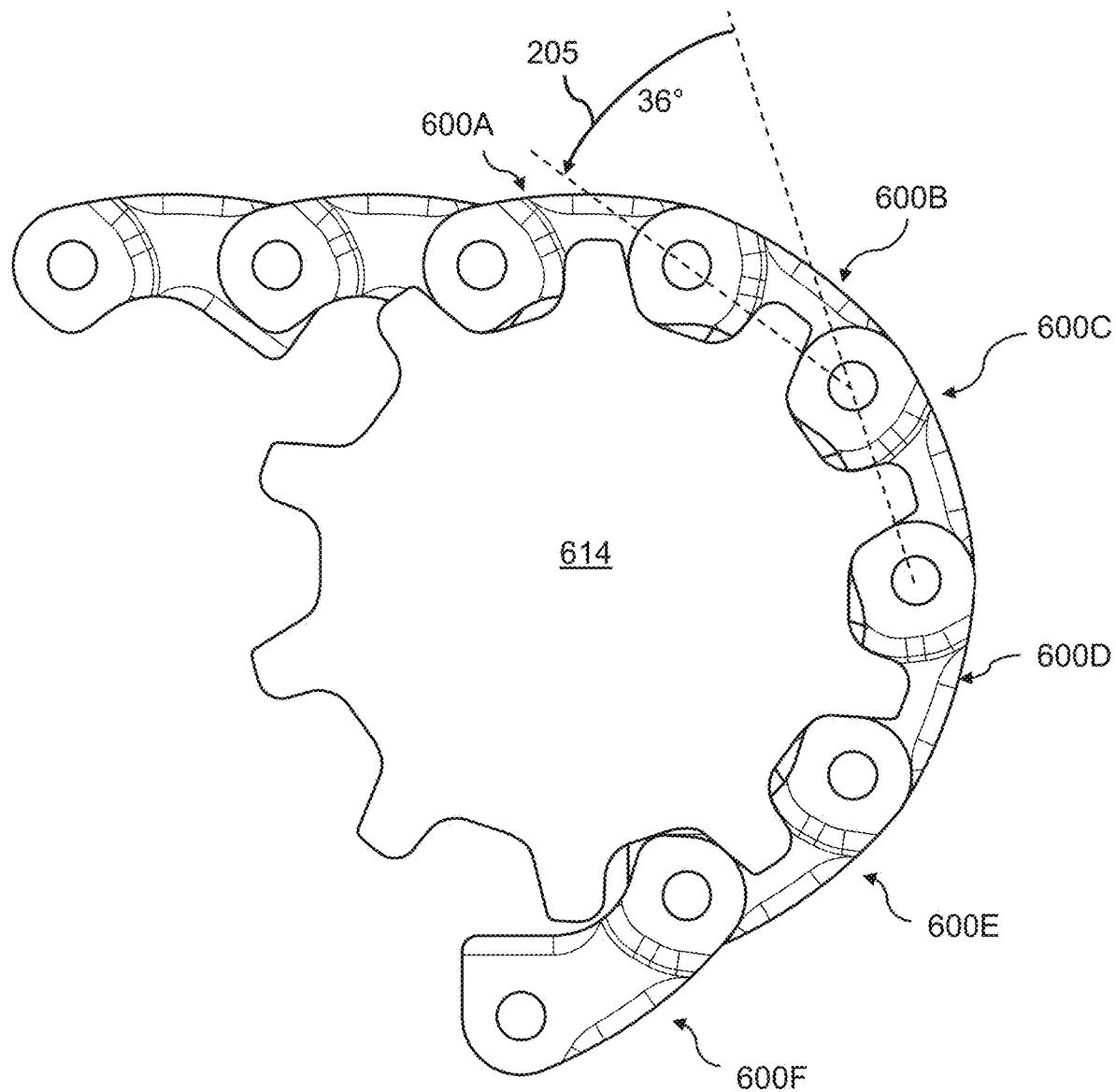
FIG. 6B is a schematic diagram showing a chain comprising the link elements according to the example of FIG. 6A engaged with a sprocket having ten teeth, in cross section.
Figure 6C:
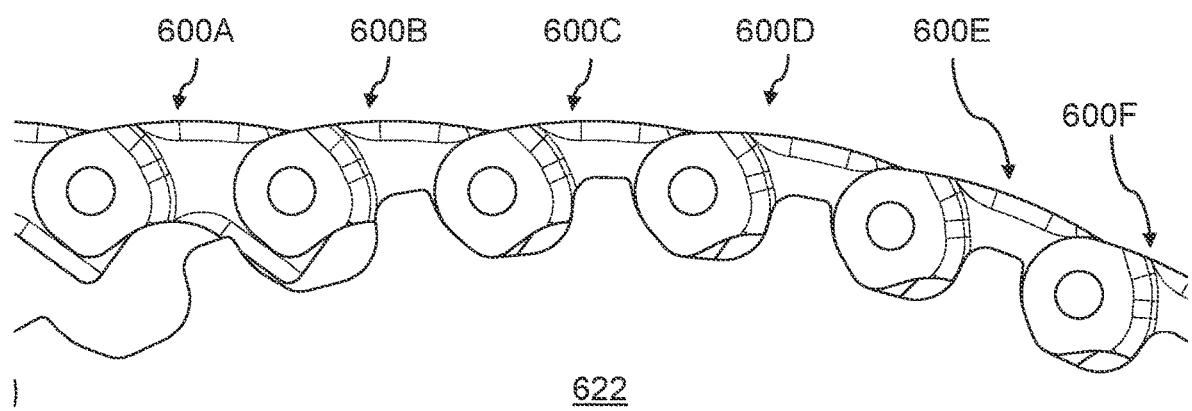
FIG. 6C is a schematic diagram showing a chain comprising the link elements according to the example of FIG. 6A engaged with a sprocket having thirty six teeth, in cross section.
Figure 6D:
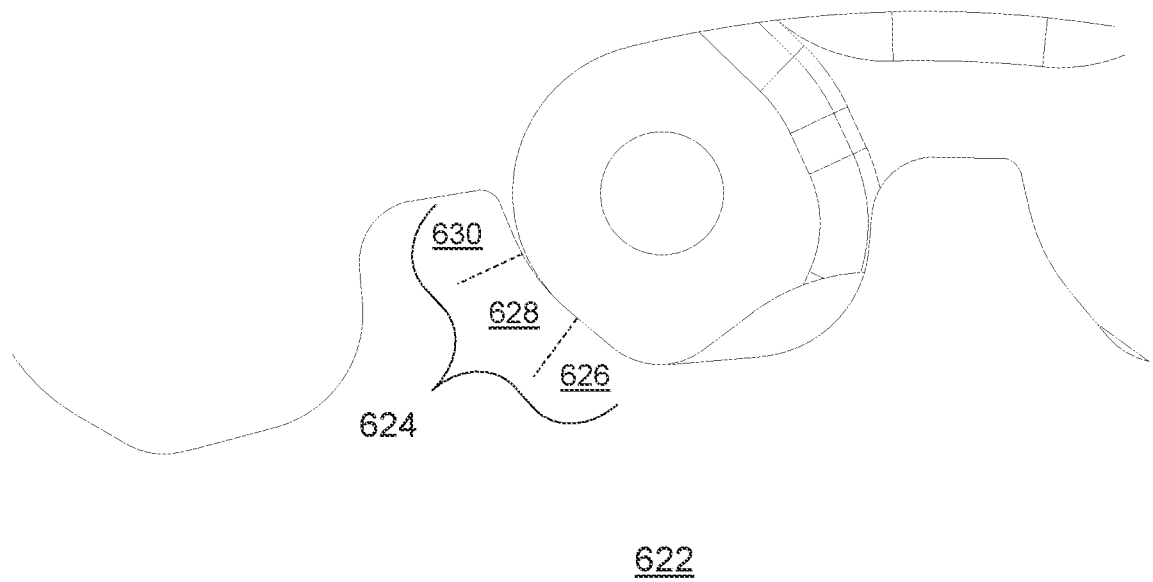
FIG. 6D is a schematic diagram showing a cropped view of a link element according to the example of FIG. 6A engaged with a sprocket having thirty six teeth.
Figure 7A:
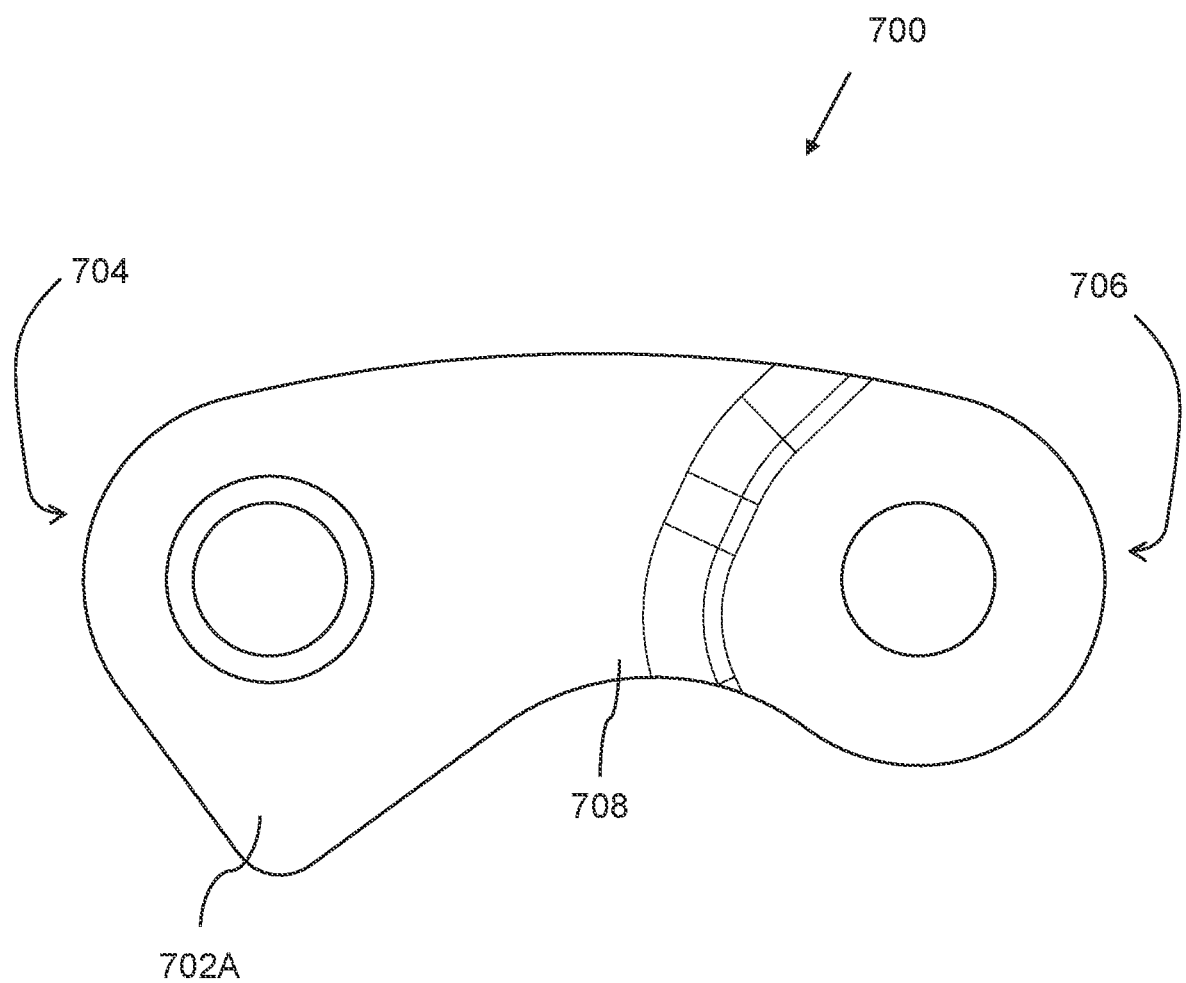
FIG. 7A is a schematic diagram showing link element according in side view, according to examples.
Figure 7B:
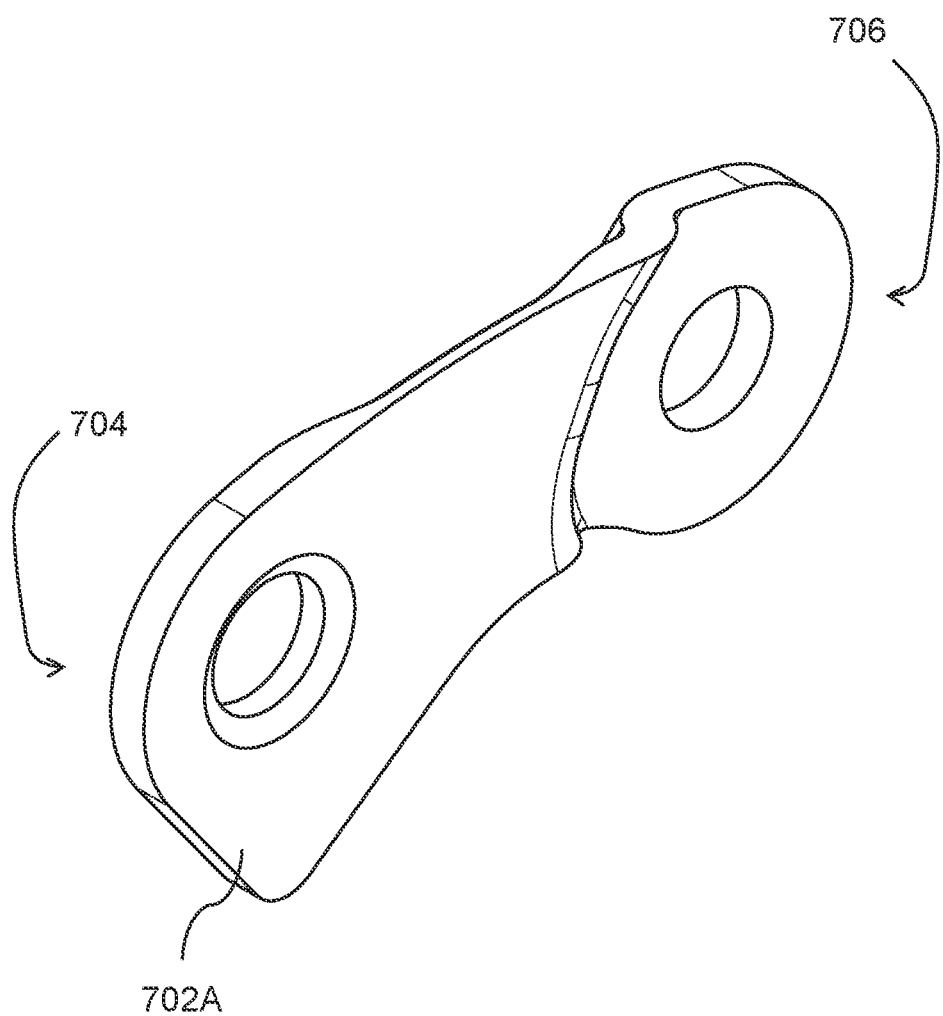
FIG. 7B is a schematic diagram showing a plate member of a link element according to the example shown in FIG. 7A in a perspective view.
Figure 7C:
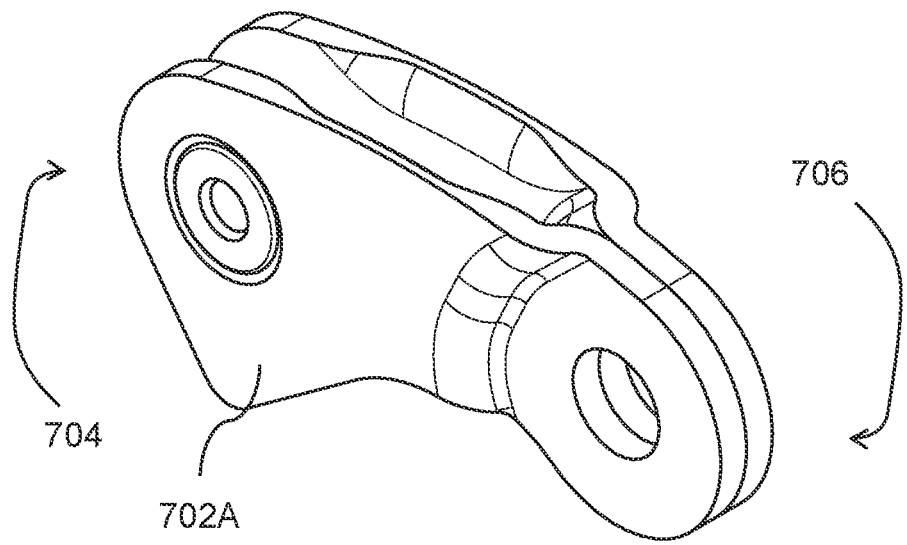
FIG. 7C is a schematic diagram showing a link element according to the example of FIG. 7A in a perspective view from above.
Figure 7D:
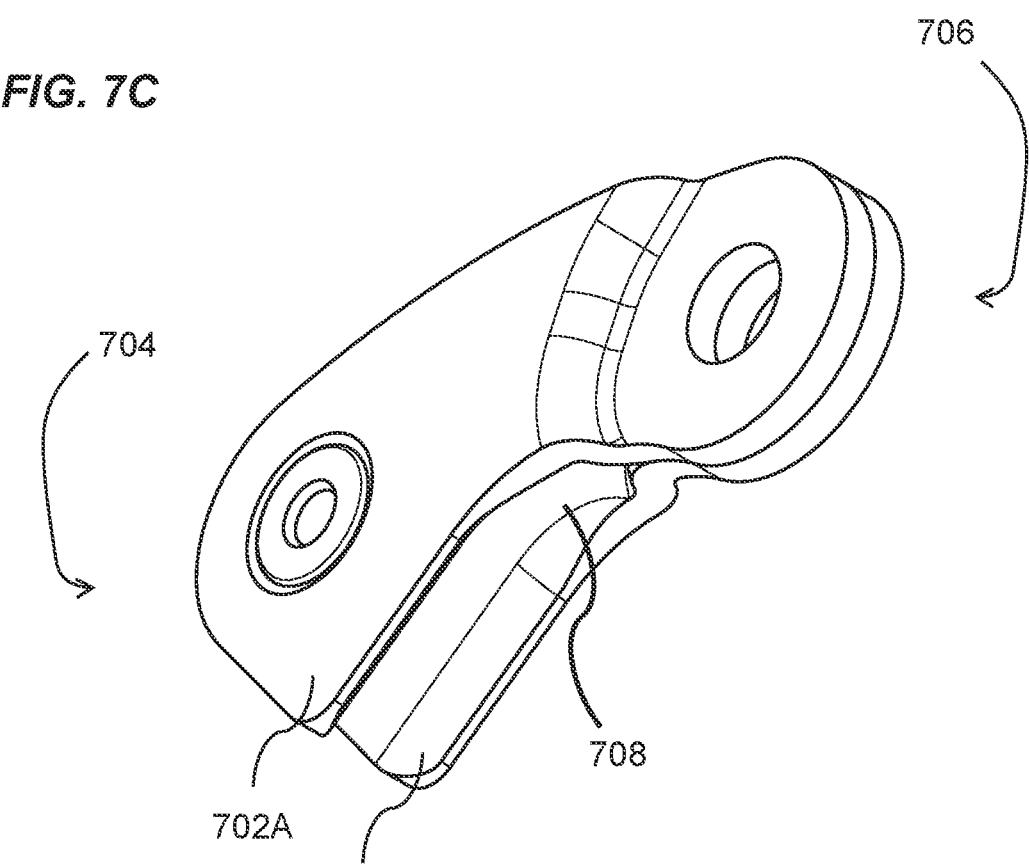
FIG. 7D is a schematic diagram showing a link element according to the example of FIG. 7A in a perspective view from below.

In some examples, modifications may be made to the profiles of the sprocket teeth in the sprocket cassette 502 to accommodate the combination of a straight flank, or tooth 602, and curved profile in the leading edge of the link element 600 which is adapted to engage the sprockets to drive the sprockets. In some examples, the sprocket cassette 502 may comprise a first group of one or more sprockets having sprocket teeth which include a first sprocket tooth profile, and a second group of one or more sprockets having sprocket teeth which include a second sprocket tooth profile, wherein the first sprocket tooth profile differs from the second sprocket tooth profile. FIG. 6B shows an example of a plurality of such link elements 600A to 600F engaging with a 10-tooth sprocket 614 wherein the teeth of the 10-tooth sprocket 614 are defined by a first sprocket tooth profile. In the example shown, the leading edge 616 of each of the teeth is adapted to clear the cranks 618, or bends, in the plates of the link elements 600A to 600F. A load bearing edge 620, or flank, of each of the teeth, in other words a flank which engages with the leading edge of the plurality of link elements 600A to 600F, comprises a straight flank for engaging the straight flank of the profile of the first tooth of the link elements 600A to 600F. FIGS. 6C and 6D shows an example in which a plurality of the link elements 600A to 600F are engaging with a 36-tooth sprocket 622, wherein the teeth of the 36-tooth sprocket include a second sprocket tooth profile 624. On larger sprockets, such as the 36-tooth sprocket shown, the second sprocket tooth profile may comprise a combination of a straight portion and a curved portion. In the example shown, a first portion 626 at the base of the second sprocket tooth profile 624, comprises a straight flank corresponding to the first tooth 602 of the link element 600. A second portion 628 of the second sprocket tooth profile, adjacent to the first portion 626 of the second sprocket tooth profile 624 comprises a working curve profile conforming to the American National Standards Institute (ANSI) B28.1-2011 Roller Chain Standard Size number 40 profile and for engaging with the curved portion of the profile of the link element 600. At a third portion 630, the second sprocket tooth profile is defined by a further straight flank with an appropriate angle of inclination for maximum load capacity. While a specific ANSI standard has been referenced above and shown in the figures, it will be appreciated that the chain 200 and sprockets 614 and 622 may be designed according to different standards where the chain is to be used for applications other than bicycle chains. In some cases, the working curve diameter, defining the second portion 628 of the second sprocket tooth profile 624 may be equal to the diameter of the curved portion of the profile of the first end 604 of the link element 600. In this case, the chain 200 at the pitch point can be simultaneously engaged with the first tooth 602 and the curved portion 612 of the profile. The load capacity of the chain 200 can cycle between that of the first tooth 602 and that of the curved profile 612 without any physical movement of the link elements 600.

FIGS. 7A to 9B show an alternative embodiment of a link element 700 for a chain 200 according to examples. In the example shown in FIGS. 7A to 9B, each link element 700 comprises two teeth 702A and 702B both located at the second end 704 of the link element 700. The first end 706 of the link element has a curved profile and no tooth. A recess 708 is provided in a first side between the first end 706 and the second end 704 for receiving a sprocket tooth and enabling the sprocket tooth to engage with a flank of a link element 700 at the first end 706.

By providing a link element 700 which has a curved profile at the flank of a first end 706 for engaging with sprocket teeth, it is possible to use the link element 700 in conjunction with known sprockets having sprocket teeth profiles which are confined by standards such as the ANSI standard mentioned above and commonly used for bicycle drive trains. In this way, a chain comprising link elements 700 according to the examples shown in FIGS. 7A to 9B provides interoperability with known sprockets while also being narrower, and more efficient than known roller chains used for bicycles. Providing a first end 706 in the link element which has a curved profile also allows the chain to function efficiently in conjunction with a wide range of sprocket sizes.

Figure 8A:
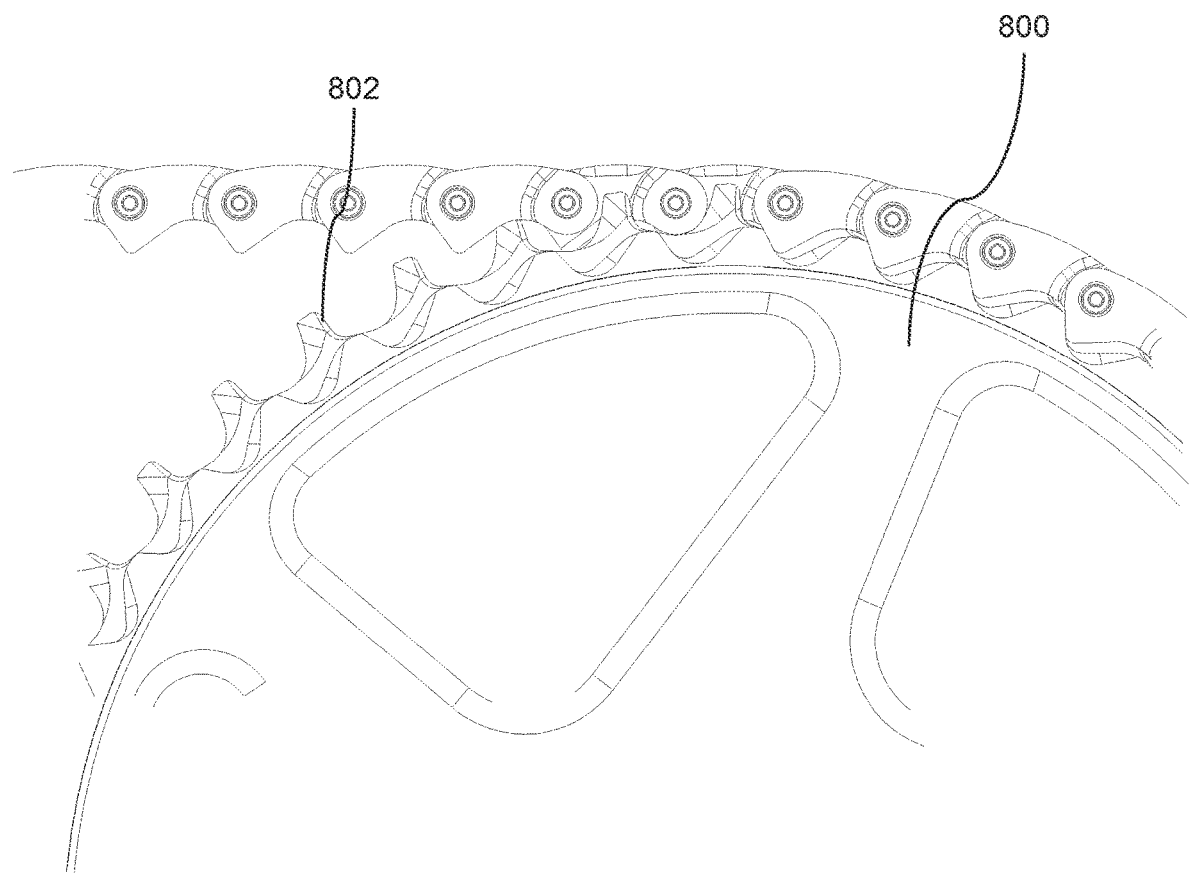
FIG. 8A is a schematic diagram showing a side view of a chain comprising link elements according to the example of FIG. 7A engaged with a chainring, according to examples, in which two plate members are removed to show the guide teeth's function.
Figure 8B:
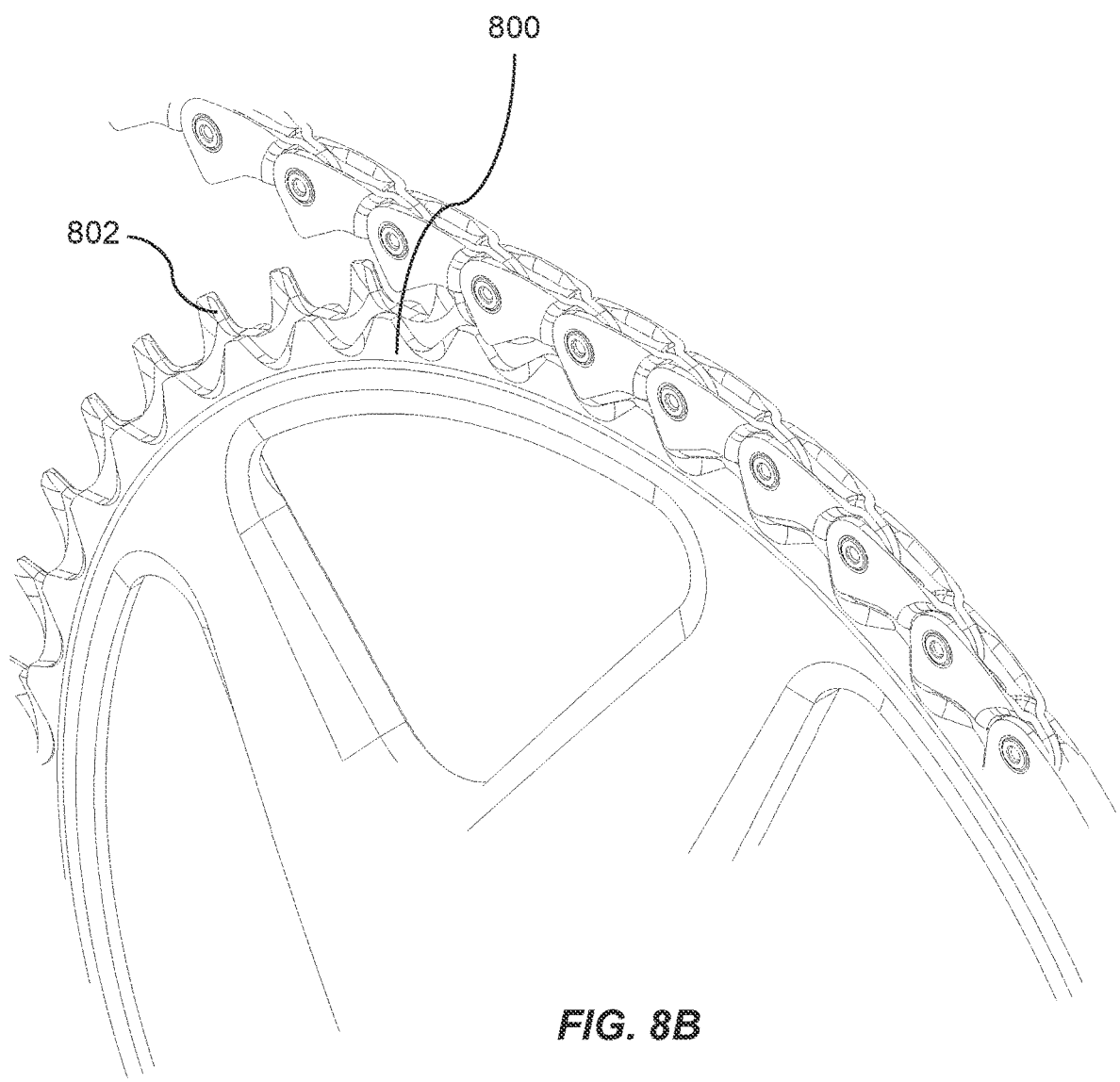
FIG. 8B is a schematic diagram showing a perspective view of the chain comprising link elements according to the example of FIG. 7A engaged with a chainring, according to examples.

As described above the sprocket cassettes 502 may be provided with spacers 510A to 510C between adjacent sprockets 504A to 504D. In the example shown in FIGS. 7A to 9B the spacers may ensure that the link elements 700 correctly sit on the sprockets during engagement. The chainring sprocket 800 shown in FIGS. 8A and 8B, is similar to the chainring sprockets shown in previous Figures but with further chamfering on the leading flank of each of the chainring sprocket guide teeth 802. While the chainring shown is adapted for use with a chain comprising link elements 700, it is to be understood that this chamfering configuration is also applicable to other examples described herein.

Figure 9A:
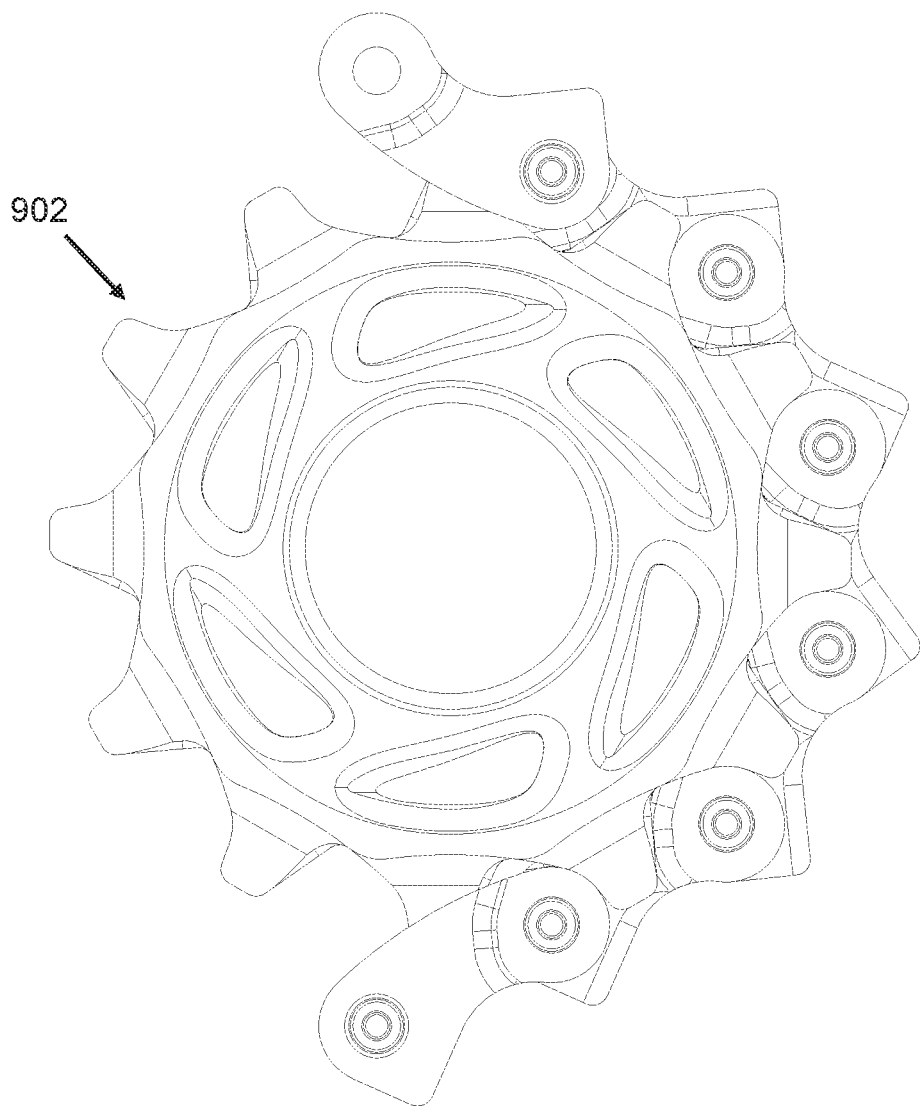
FIG. 9A is a schematic diagram showing an upper jockey wheel engaged with a chain comprising link elements according to the example shown in FIG. 7A, in which several plate members are removed to show the engagement between the chain and the jockey wheel.
Figure 9B:
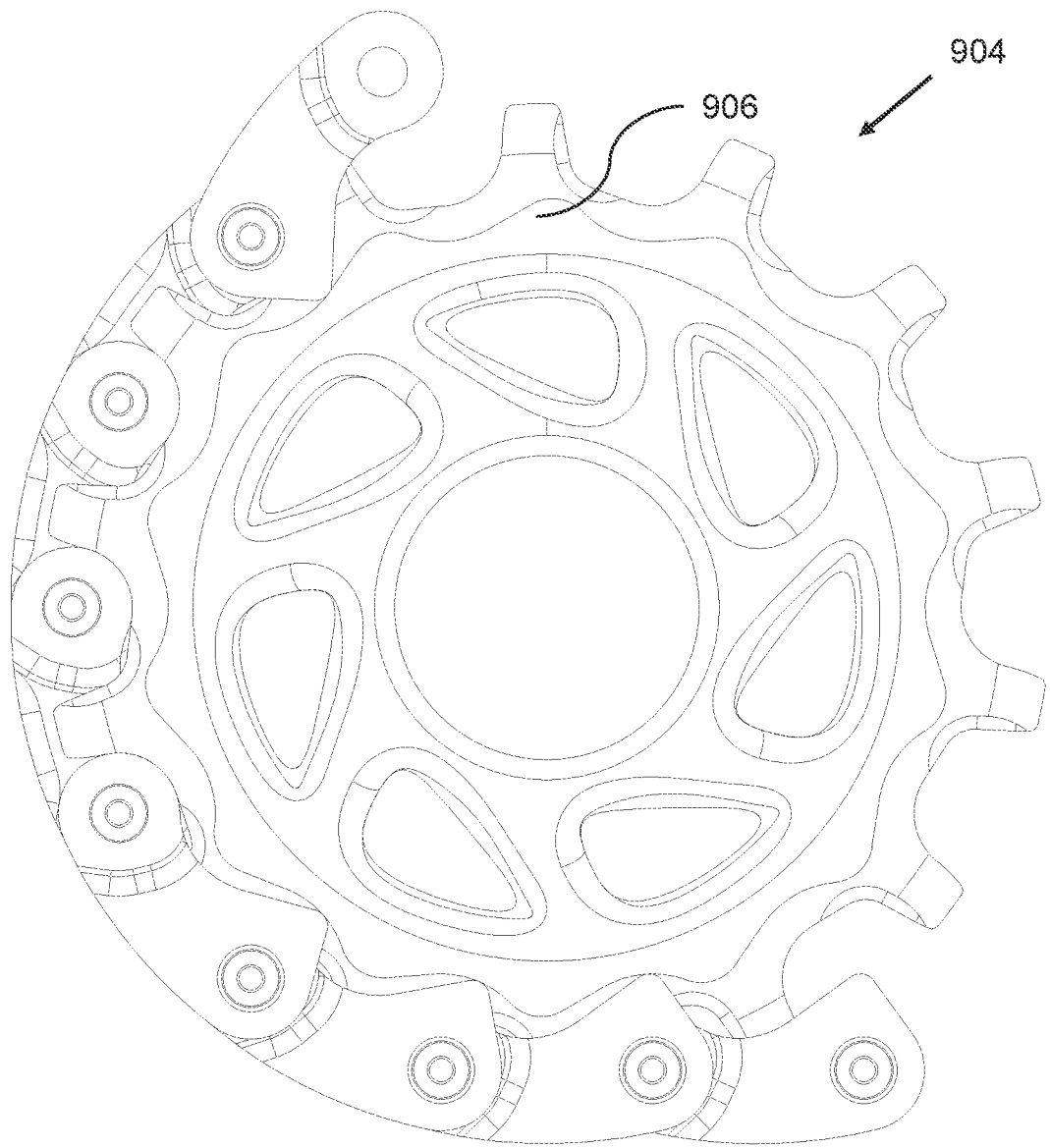
FIG. 9B is a schematic diagram showing a lower jockey wheel engaged with a chain comprising link elements according to the example shown in FIG. 7A, in which several plate members are removed to show the engagement between the chain and the jockey wheel.

FIGS. 9A and 9B show a chain 200 comprising link elements 700 articulating around an upper jockey wheel 902 and a lower jockey wheel 904 respectively, according to examples. Jockey wheels 902 and 904 are generally used in derailleurs used for bicycles to maintain tension on a slack side of the chain 200 during use. In some cases, only one jockey wheel 904 may be provided. The jockey wheel comprises grooves 906 on at least one face of the jockey wheel adapted to engage with teeth of the link elements 700 to substantially maintain a lateral position of the chain with respect to the jockey wheel 904.

Figure 10:
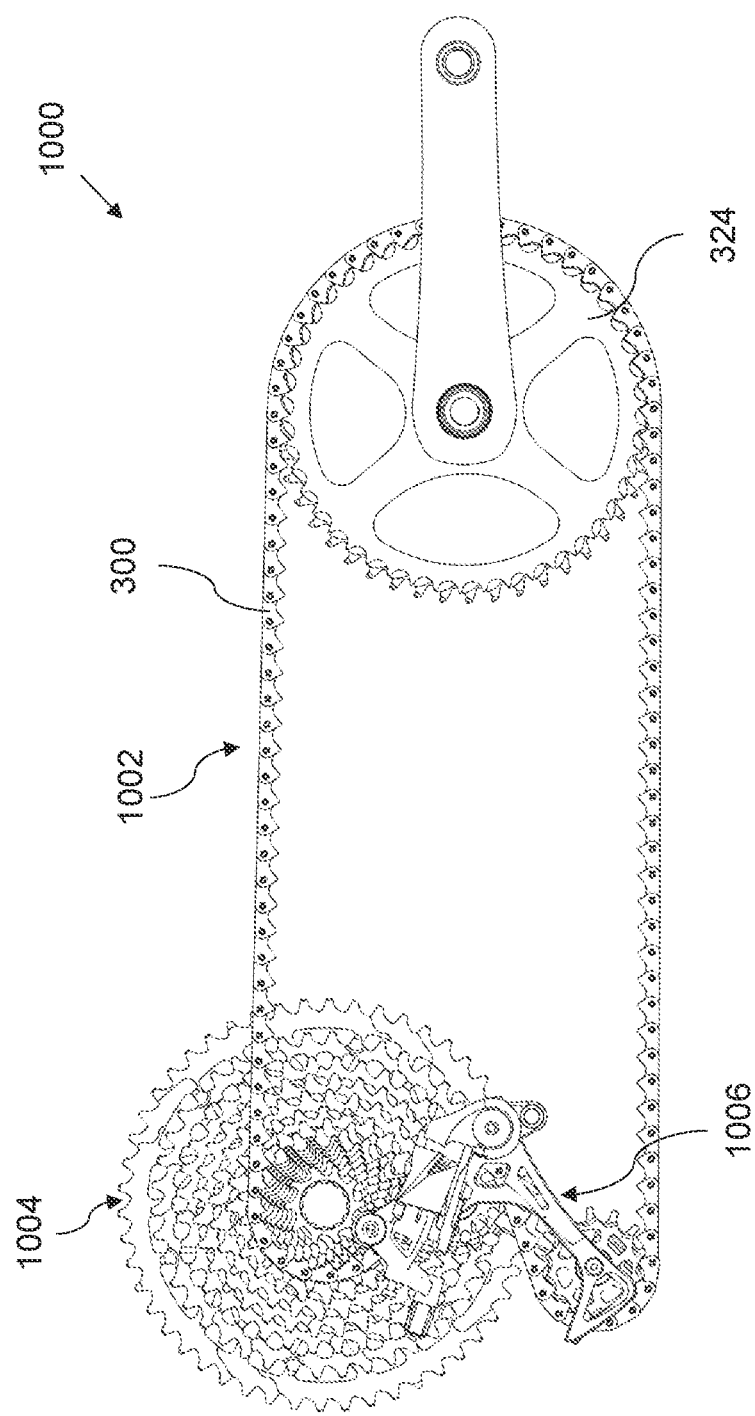
FIG. 10 is a schematic diagram showing a chain drive system comprising a chain, a chainring, a sprocket cassette, and a derailleur according to examples.

FIG. 10 shows a chain drive system 1000 comprising a chain 1002 and a chainring 324 according to the embodiments described above, and a sprocket cassette 1004 comprising a plurality of sprockets. The sprockets in the sprocket cassette 1004 include sprocket teeth comprising a tooth profile which corresponds to a profile of the flanks of at least one of the teeth of each of the plurality of link elements 300. The chain drive system 1000 comprises a derailleur 1006 to provide shifting between the plurality of sprockets of the sprocket cassette 1004. Due to the reduced width of the chain 1002 as compared to known roller chains suitable for bicycles, a larger number of sprockets are provided in the sprocket cassette 1004. In this example, the sprocket cassette 1004 comprises 16 sprockets each being 1.5 millimetres thick and having a centre to centre spacing of 2.75 millimetres. The total centre to centre width occupied by the 16-sprocket cassette 1004 is therefore 41.25 mm.

In the present example, the sprockets in the cassette 1004 comprise means for assisting the shifting of the chain 1002 between the sprockets. At least some of the sprockets may comprise ramps in a side of the sprocket adjacent to a smaller sprocket to assist in upshifting the chain from the smaller sprockets to the larger sprockets. These ramps may be machined, stamped, or provided in the side of the sprockets in any other suitable way. To assist in downshifting the sprockets may each comprise some offset teeth and some heavily chamfered teeth. When downshifting the chain 1002 from a first sprocket to a second sprocket, the chain 1002 engages with an offset tooth in the first sprocket to move the chain 1002 slightly out of the plane of the first sprocket. The chain 1002 then hits a heavily chamfered tooth on the first sprocket which then slides the chain 1002 off the first sprocket onto the second, lower, sprocket. The positions of the modifications in the sprockets such as the grooves, offset teeth and chamfered teeth may be positioned at specific locations such that they align with similar features in adjacent sprockets in order to enable efficient shifting between a large number of sprockets. Where such features as these are included in sprockets to be used with known roller chains, these features may be adapted to engage with either of an inner link element or an outer link element. For example, where grooves are provided to allow upshifting between two sprockets, the grooves may be adapted to engage with an outer link element. Consequently, shifting may rely on correct alignment of a specific type of link element and the features in the sprockets, such as grooves. In the present example, as each link element 300 of the chain 1002 is the same, the grooves and other shifting mechanisms are not dependent on engaging with a specific type of link element. As such, shifting may be provided more efficiently, more quickly and more smoothly than in known roller chain drive systems.

Figure 11:
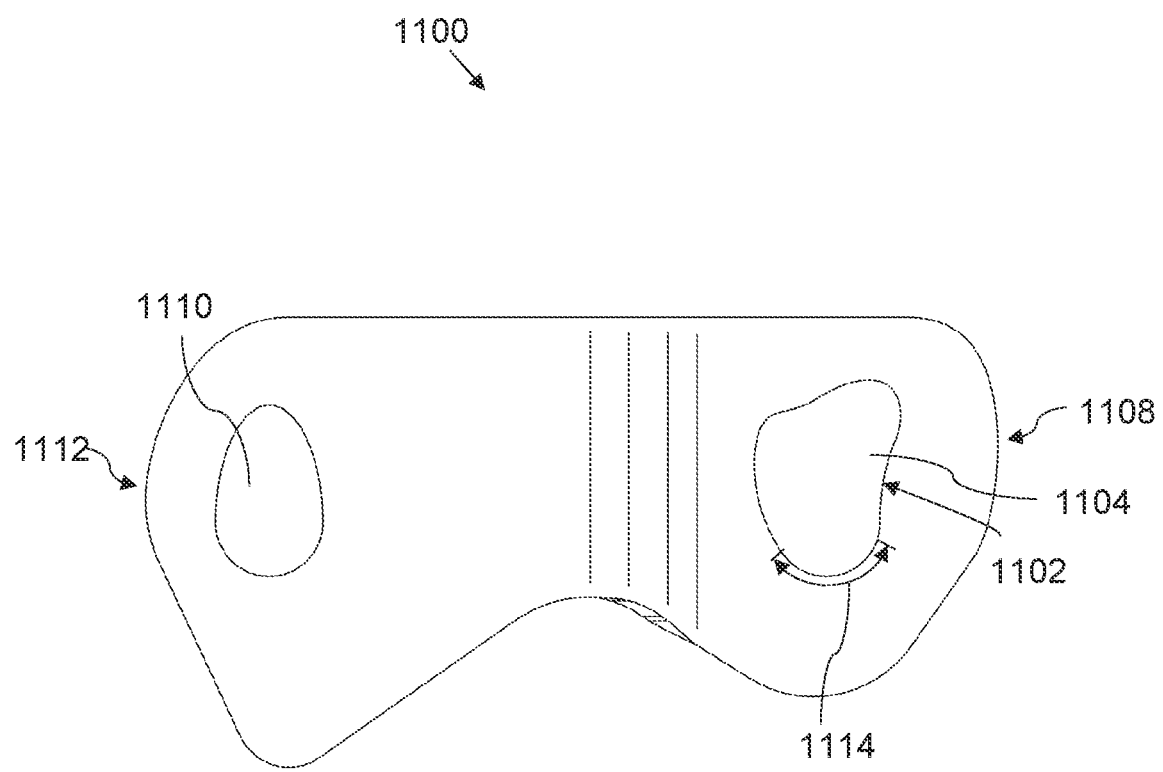
FIG. 11 is a schematic diagram showing a side view of a link element adapted for use with rocker pin joints according to an example.

In the embodiments described above and shown in FIGS. 1 to 10, the link elements are connected by concentric pin joints 212a to 212e. However, in some examples the link elements may be pivotably attached by rocker pin joints. In FIG. 11, a plate member 1100 of a link element, adapted to be pivotably attached to further link elements by a rocker pin joint, is shown. The rocker pin joints each comprise a pin member, which is adapted to roll against an inner surface 1102 of an aperture 1104 at a first end 1108 of each link element to reduce the sliding contact in the joints between adjacent link elements when the link elements are articulating with respect to one another. By reducing the amount of sliding action which occurs in the joints in the chain, it is possible to increase both the efficiency and the durability of such chains compared to similar chains which use concentric pin joints.

The link element comprises a first aperture 1110 at a second end 1112 for fixedly receiving a pin member having an ovate cross section, the cross section being taken along an axis about which the pin member rolls during articulation of the link elements. The term ovate is used here to describe the cross section of the pin member as being generally ovoid or egg shaped. In the example according to FIG. 11, the cross section of the pin member is symmetrically ovate, although it will be appreciated that in some examples, the cross section of the pin member may not be symmetrical. At the first end 1108 of the link element there is provided a second aperture 1104 for receiving the pin member having an ovate cross section. The profile of the second aperture 1104 is adapted to allow the pin member to roll against an inner surface of the second aperture 1104 through at least part of a range of articulation of the link element with respect to an adjacent link element. In some examples, the cross section of the pin member may include a concave portion.

A portion 1114 of the second aperture 1104 has a profile which is defined by an arc of constant radius. This portion 1114 corresponds with a base of the pin member which has a cross section defined by a similar arc of constant radius. The second aperture 1104 and the pin member are arranged such that for a part of the range of articulation of the link element with respect to the adjacent link element, the pin member is adapted to concentrically slide along at least a part of the portion 1114 of the second aperture 1104.

Figure 12:
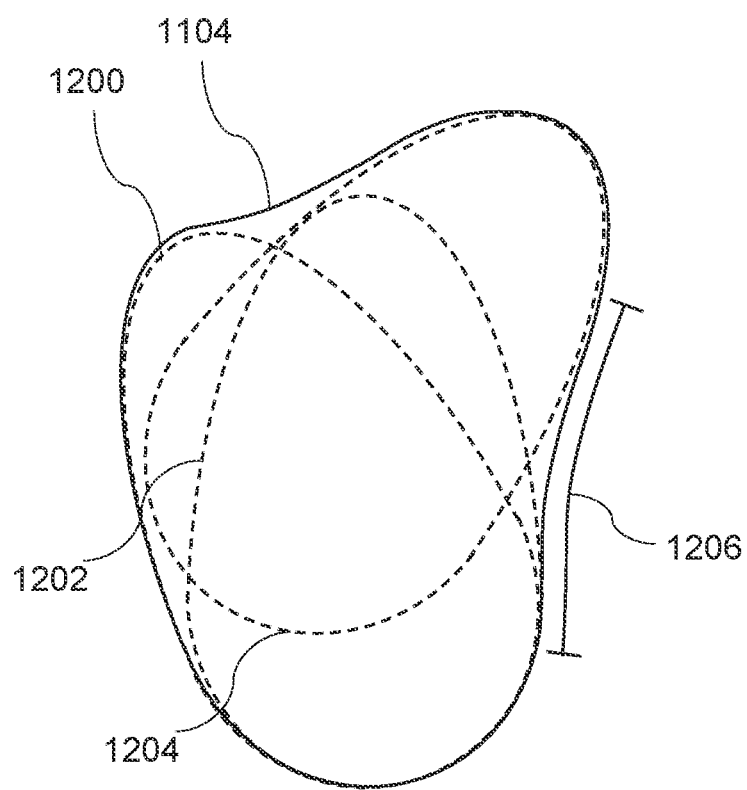
FIG. 12 is a schematic diagram showing an aperture of a link element for a rocker pin joint according to an example.

FIG. 12 shows an outline of the second aperture 1104 along with a plurality of outlines 1200 to 1204 of the pin member, shown in broken lines. The outlines 1200 to 1204 represent different positions the pin member takes within the aperture 1104 during articulation of the link element with respect to an adjacent element. The pin member and the second aperture 1104 are adapted such that, during articulation of adjacent link elements in the reverse direction from an arrangement in which lengths of the adjacent link elements are parallel, the pin member moves from a first position 1202 to a second position 1200 by concentrically sliding within the second aperture 1104. Reverse articulation generally occurs when the chain engages with upper jockey wheels. The part of the chain which engages with the jockey wheels is on the slack side of the chain and so is under reduced tension compared to the tight drive side of the chain. Accordingly, the introduction of sliding action within the pin joint has less impact on the overall efficiency of the system compared to examples where sliding contact occurs in the pin joint during forward articulation of the chain at the tight side of the chain. When the link element articulates with respect to an adjacent link element in the forward direction, the pin member moves from the first position 1202 to a third position 1204 by rolling against the inner surface of the aperture along a portion 1206. In this way, the rocker pin joint may be adapted to perform a combination of rocking and concentric sliding. By introducing a small amount of concentric sliding into the rocker pin joint through a part of the range of articulation between link elements, which occurs during reduced-load reverse articulation, it is possible to reduce the overall size of the second aperture 1104 and thereby increase the amount of plate material and the strength in the link elements while mitigating an increase in frictional losses due to sliding action.

In the example shown in FIG. 11 and FIG. 12, the cross section of the pin member for the rocker pin joint has a first portion defined by an arc of constant radius, the radius being 1.25 millimetres, and a second portion defined by part of an ellipse, the ellipse having a major axis of 5.5 millimetres and a minor axis of 2.5 millimetres. It has been found that an ellipse having a major to minor axis ratio of around 2.2 is preferred as it provides a sufficiently large radius of curvature to handle the maximal expected stresses under tension while maintaining a suitable size.

Figure 13:
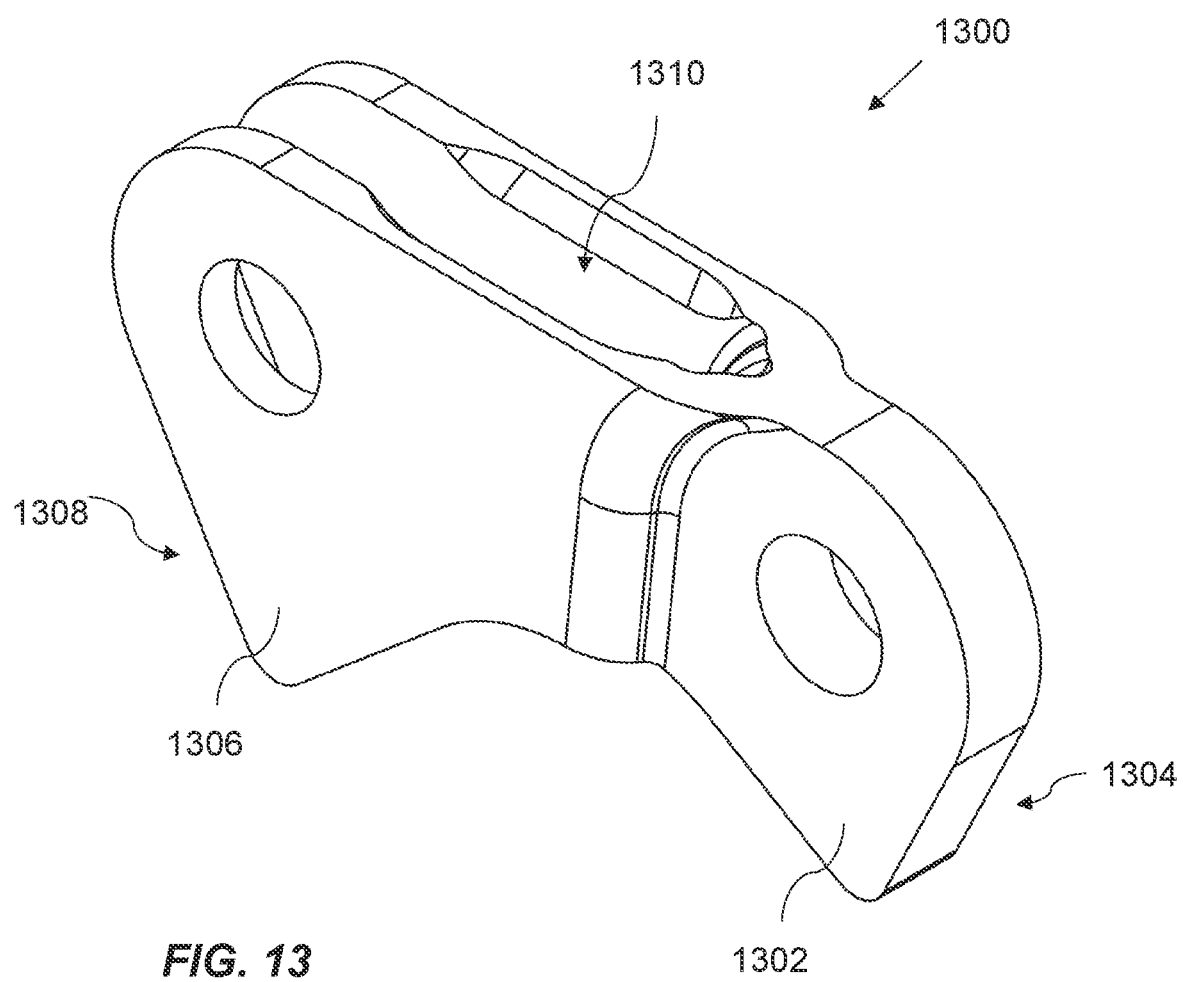
FIG. 13 is a schematic diagram showing a link element constructed from a single piece according to an example.

The examples described above relate to link elements each being formed from two plate members. However, in an alternative embodiment, shown in FIG. 13, the link elements 1300 may each be formed from a single piece of material, for example through injection moulding, powder pressing, or additive manufacturing. The link element 1300 comprises a first tooth 1302 located at a first end 1304 of the link element 1300 and a second tooth 1306 located at a second end 1308 of the link element 1300. There is also a third tooth located at the second end 1308 of the link element 1300 to increase the contact surface with the chainring although this is obscured in FIG. 13 by the second tooth 1308. Having three teeth may provide a broader contact area on the chainring and hence may increase stability of the chain when engaging with the chainring. The recess in the first side, not visible in FIG. 13, between the first 1302 and second teeth 1306 and the recess 1310 in the second side, opposing the first, may be formed by machining the link elements 1300 or in a mould used to manufacture the link elements 1300. Where the recesses are formed by plate members as described above, the recesses may form a channel, whereas where the recesses 1310 are formed by machining, they may not be connected and so not form a channel. Using single solid elements for the link elements 1300 provides the link elements with increased strength and rigidity making them more efficient at transferring power between chainrings and sprockets and more reliably.

Further features will now be described with respect to FIGS. 14 to 20B. While FIGS. 14 to 20B illustrate said features with respect to a specific embodiment of the link element 700 in which the first end 706 has a curved profile, it will be understood that these features are applicable to other embodiments described herein, in particular embodiment of the link elements shown in FIGS. 2A to 2F, 3A to 3E, and 6A to 6D.

Figure 14:
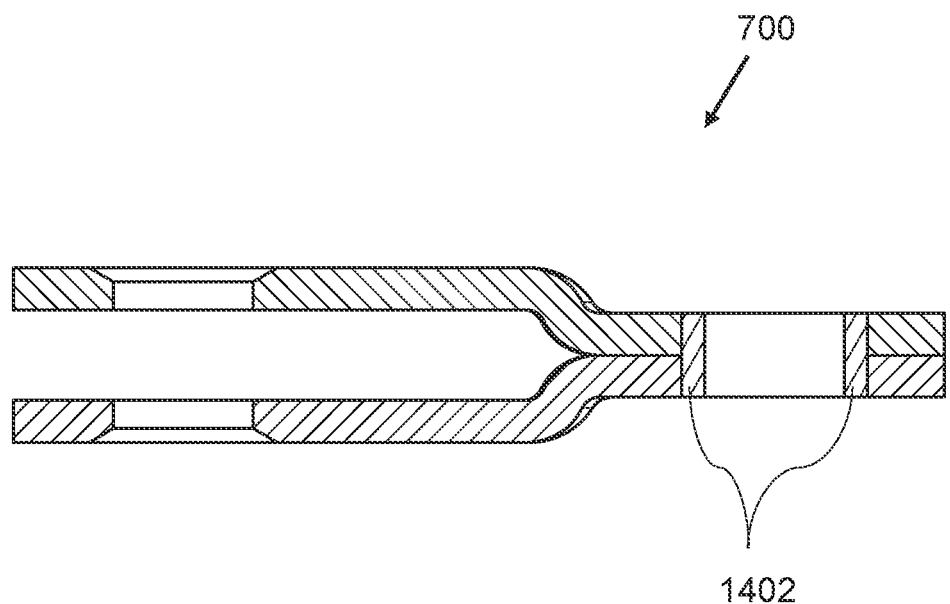
FIG. 14 is a schematic diagram showing a top view of a link element comprising a bushing in cross section, according to examples.
Figure 15A:
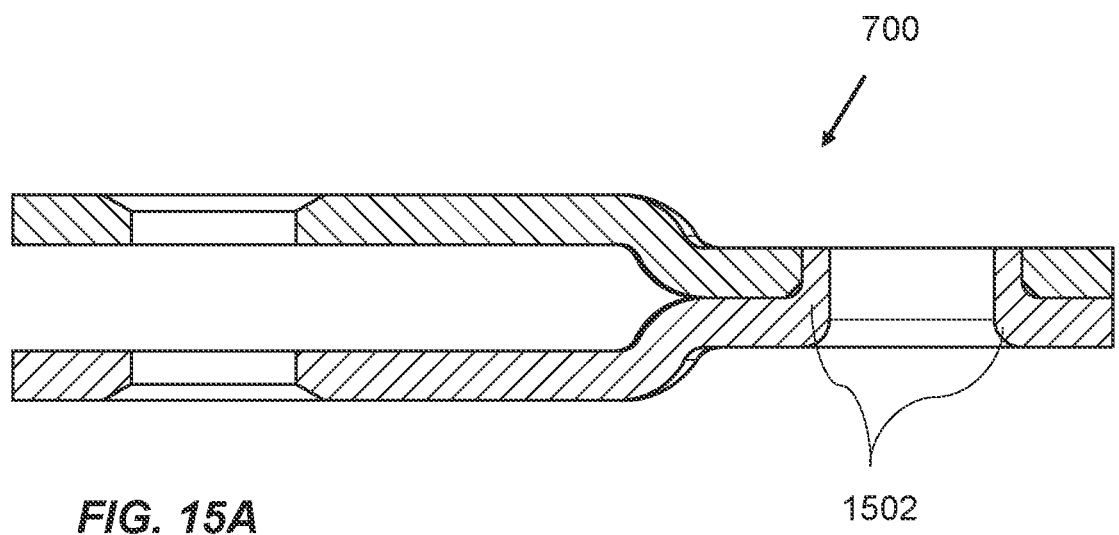
FIG. 15A is a schematic diagram showing a top view of a link element comprising a bushing integrally formed from a plate member in cross section, according to examples.
Figure 15B:
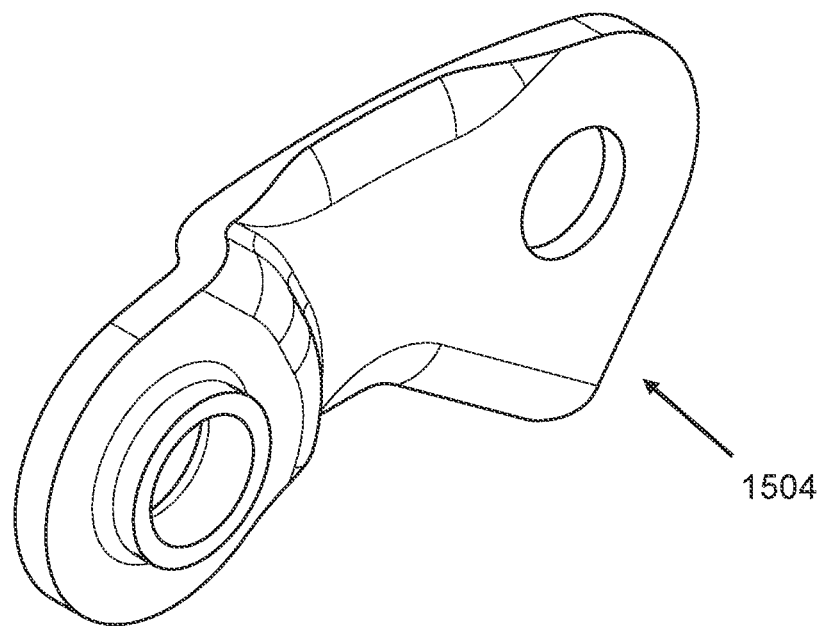
FIG. 15B is a schematic diagram showing a perspective view of a plate member of the link element according to the example of FIG. 15A.

FIG. 14 shows an example in which the cylindrical pin joint used to connect adjacent link elements 700 includes a bushing 1402. The bushing 1402 included in this example provides an increase in wear durability and efficiency during articulation of a first link element with respect to a second adjacent link element. FIGS. 15A and 15B show an example in which a bushing 1502 is integrally formed from a first plate member 1504 of a link element.

Figure 16:
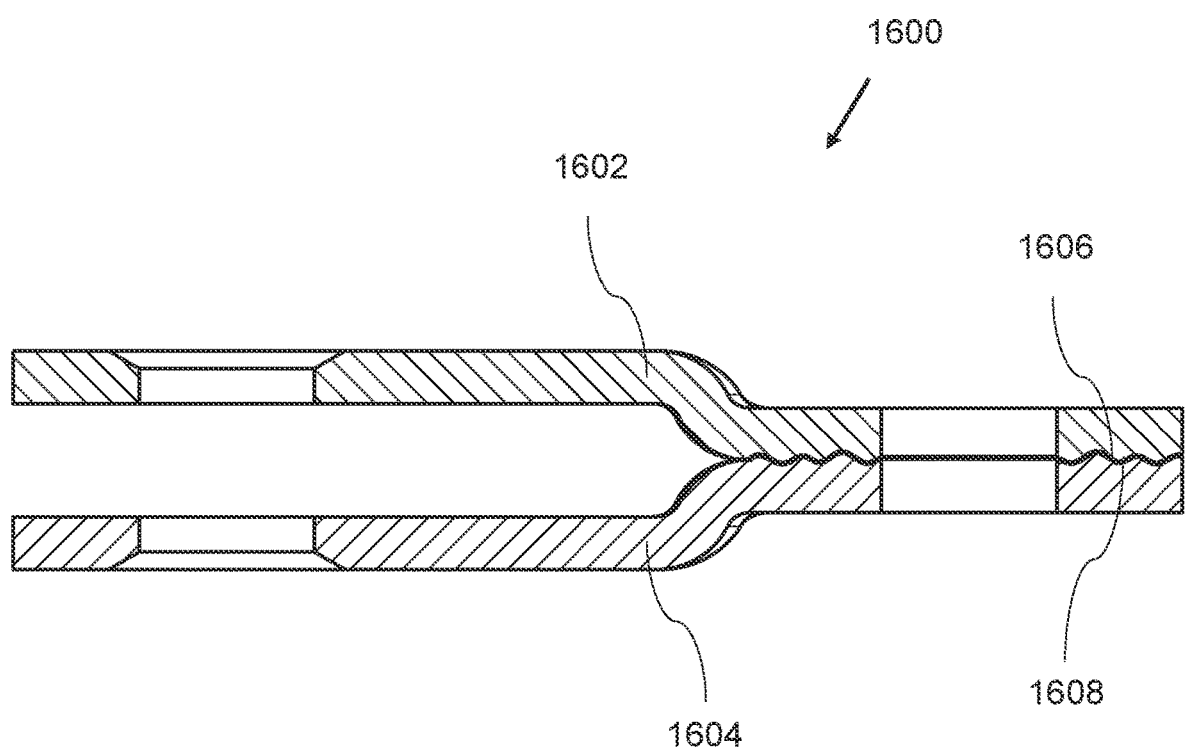
FIG. 16 is a schematic diagram showing a top view of a link element comprising grooves at a contacting surface of two plate members in cross section, according to examples.
Figure 17:
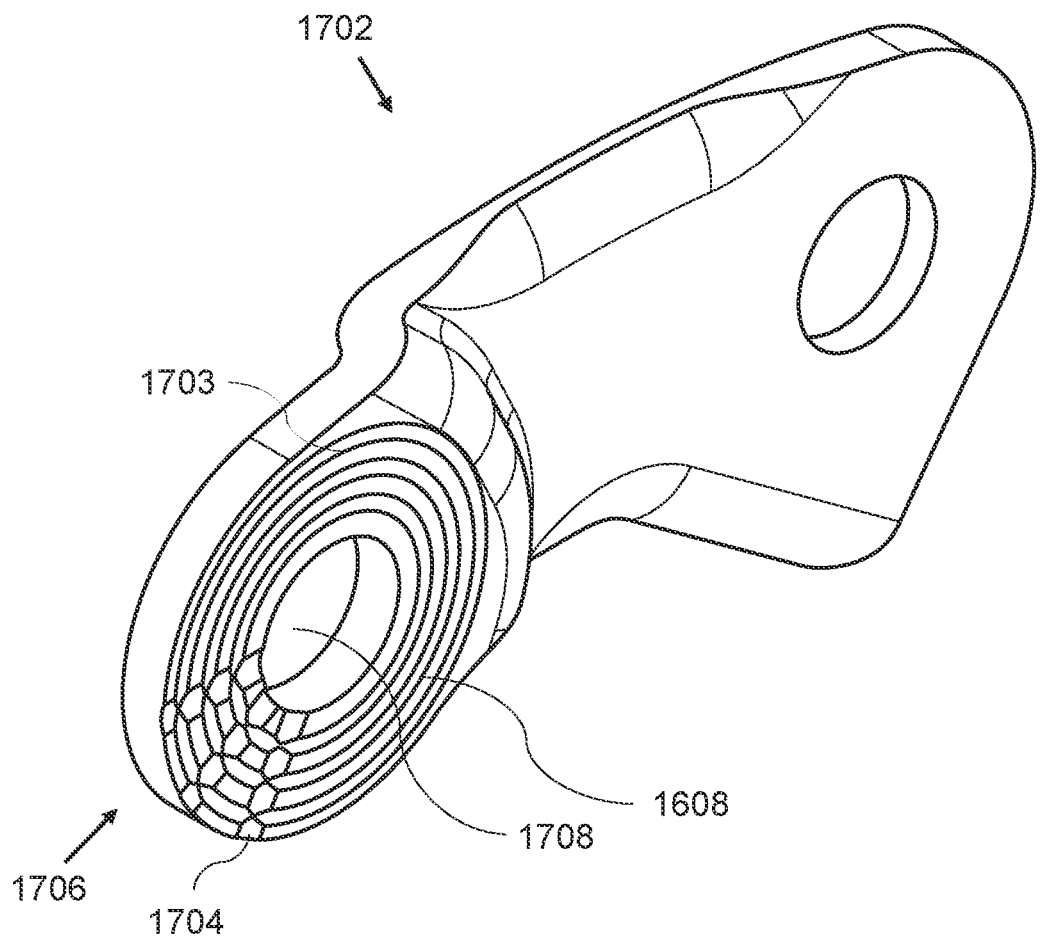
FIG. 17 is a schematic diagram showing a perspective view of a plate member of a link element comprising grooves at a contact surface and one or more channels according to examples.

FIG. 16 shows an example in which a portion of each plate member 1602 and 1604 of a link element 1600 comprises a grooved surface 1606 and 1608 adapted to interlock with a corresponding surface of a matching plate member. By providing a grooved surface 1606 and 1608 on a portion of the plate members 1602 and 1604 which are in contact, better lubrication retention may be provided in regions of the link elements 1600 which benefit most from lubrication during use, in particular the pin joint. FIG. 17 shows an example of a plate member 1702 comprising similar grooved surfaces 1703 to the grooved surfaces 1608 shown in the example of FIG. 16, and further comprising one or more channels 1704 in a surface of the plate member 1702 at a first end 1706 of the plate member 1702 extending toward an aperture for a cylindrical pin joint 1708. The one or more channels 1704 provide a mechanism for debris to be evacuated from the cylindrical pin joint of the link element.

Figure 18A:
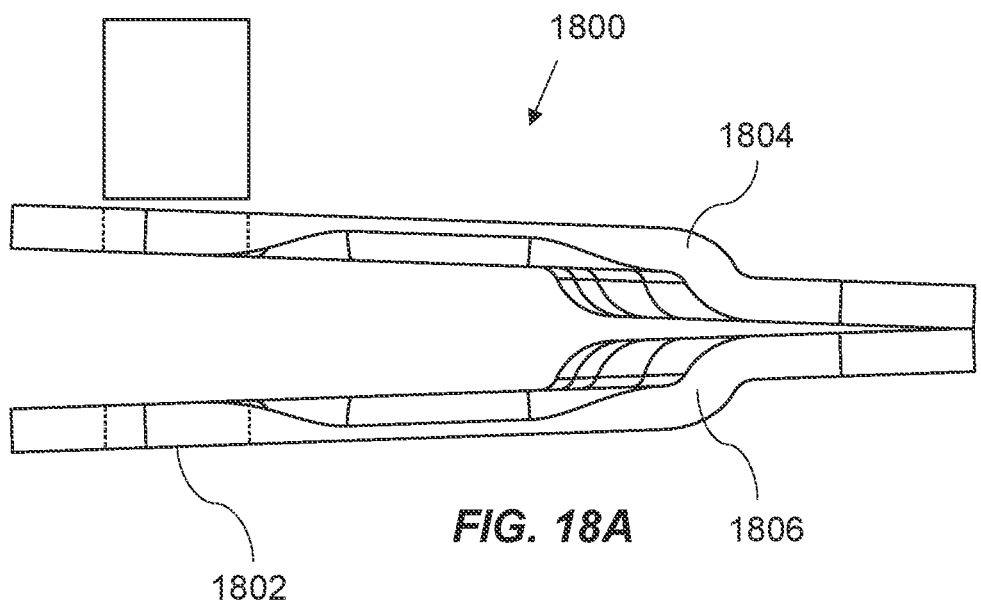
FIGS. 18A and 18B are schematic diagrams showing a top view of a link element constructed as a leaf spring assembly according to examples.
Figure 18B:
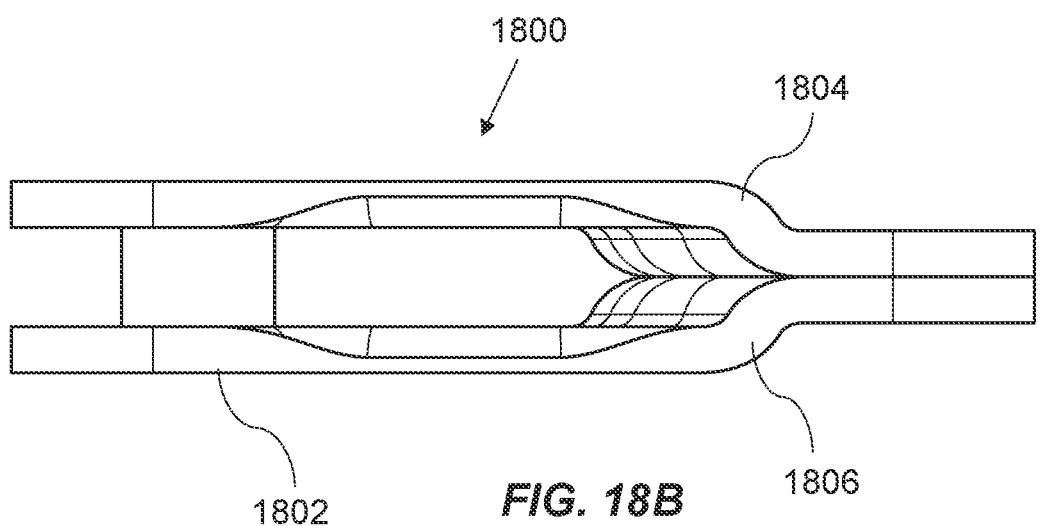

FIGS. 18A and 18B shows an example in which a link element 1800 is constructed using a leaf spring assembly. In this example, the pin hole 1802 through which pin is to be pressed to join the link elements may be constructed at an angle in the top plane. In this way, inserting a pin into the pin hole 1802 may cause the portions of the plate members 1804 and 1806 which are to be in contact to be pressed together with increased tension. Using a leaf spring assembly in the construction of the link element 1800 may increase the force compressing the plate members 1804 and 1806 together to counteract forces which may act during use to separate the plate members.

Figure 19A:
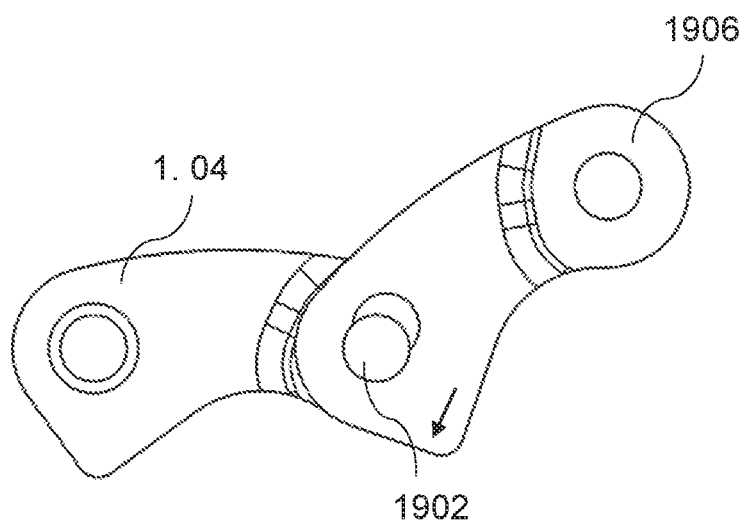
FIGS. 19A to 19C are schematic diagrams illustrating a sliding pin-joint mechanism for a link element, according to examples.
Figure 19B:
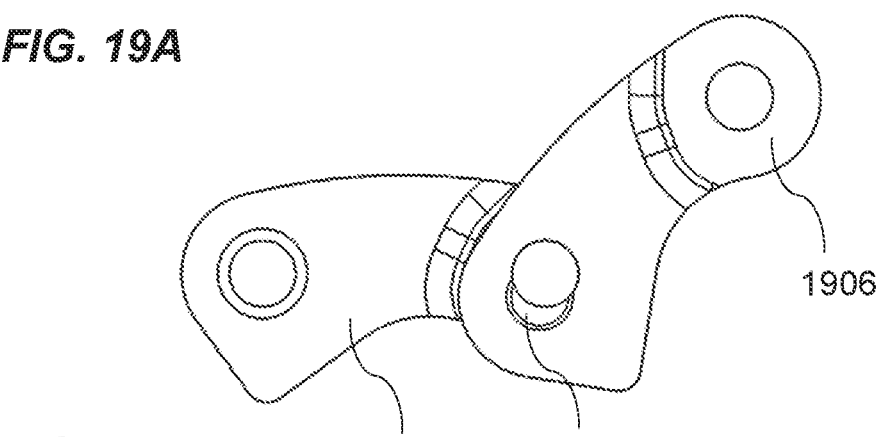
Figure 19C:
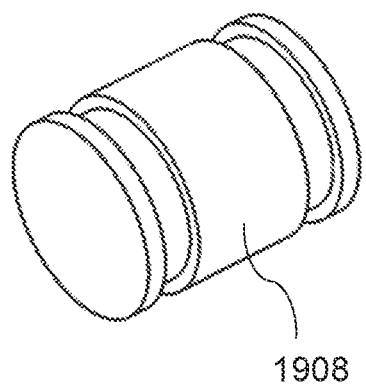
Figure 20A:
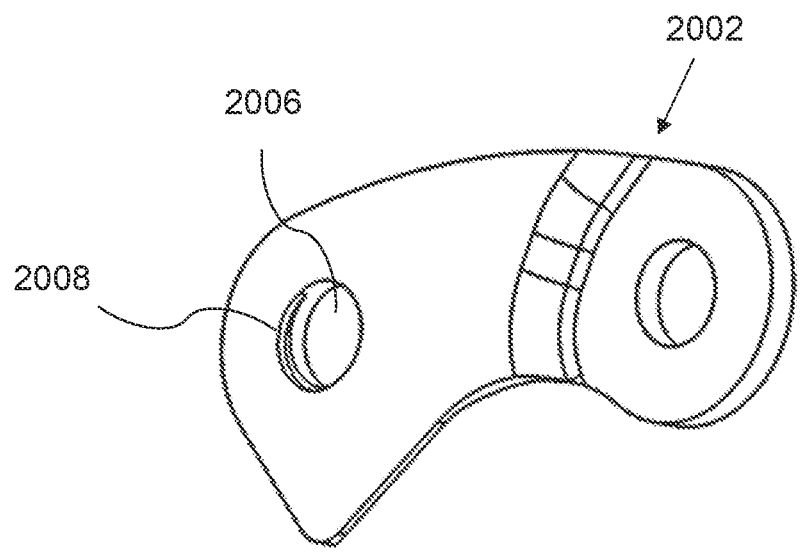
FIGS. 20A and 20B are schematic diagrams illustrating a pin joint assembly for a link element, according to examples.
Figure 20B:
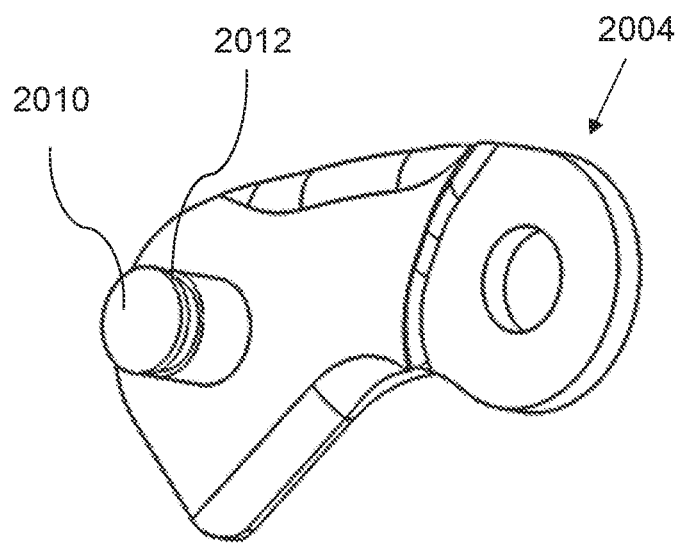

FIGS. 19A to 19C shows a sliding pin joint mechanism 1902. At a given orientation of a first link element 1904 with respect to a second link element 1906 a cylindrical pin member 1908 is capable of being inserted into apertures in the first end of the first link member 1904 and a second end of the second link 1906 member. FIG. 19A shows the link elements 1904 and 1906 in a closed position, while FIG. 19B shows the link elements 1904 and 1906 in an open configuration in which the link elements 1904 and 1906 can be separated. FIGS. 20A and 20B show plate members 2002 and 2004 for a link element which can be constructed into a chain using similar link elements without the use of tools. The first plate member 2002 comprises an aperture 2006 in which there is a ridge 2008 for releasably holding a cylindrical pin member 2010. The second plate member 2004 comprises a cylindrical pin member 2010 which is integrally formed from the plate member 2004 and which comprises a ridge 2012 for interlocking with the ridge 2008 included in the aperture 2006.

Figure 21A:
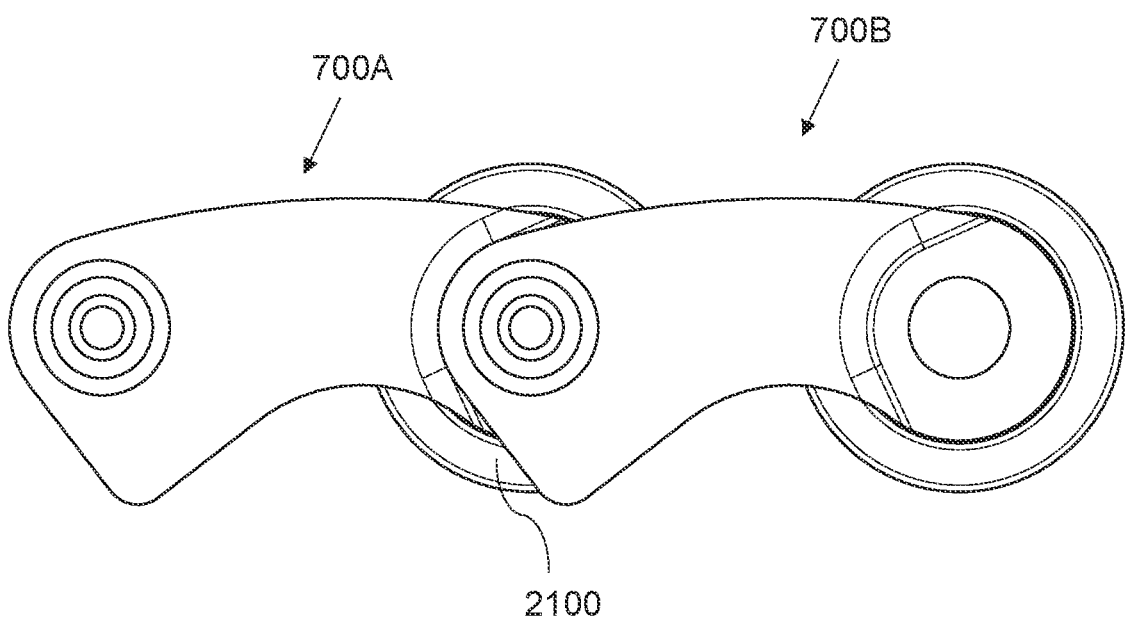
FIGS. 21A and 21B are schematic diagrams showing a roller for a link element according to examples in a side view and a top, cross-sectional view, respectively.
Figure 21B:
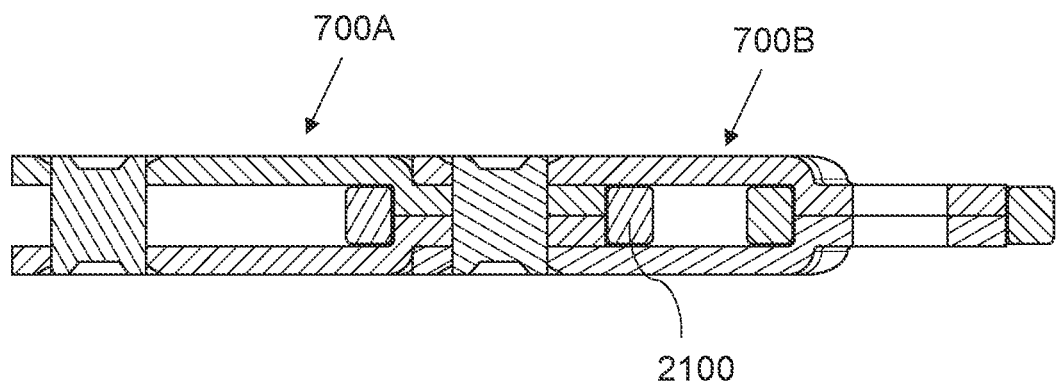

FIGS. 21A and 21B show two link elements 700A and 700B according to the example of FIG. 7A to 7D, wherein the link elements also include a roller 2100 positioned over the attachment between the two link elements 700A and 700B.

Figure 22:
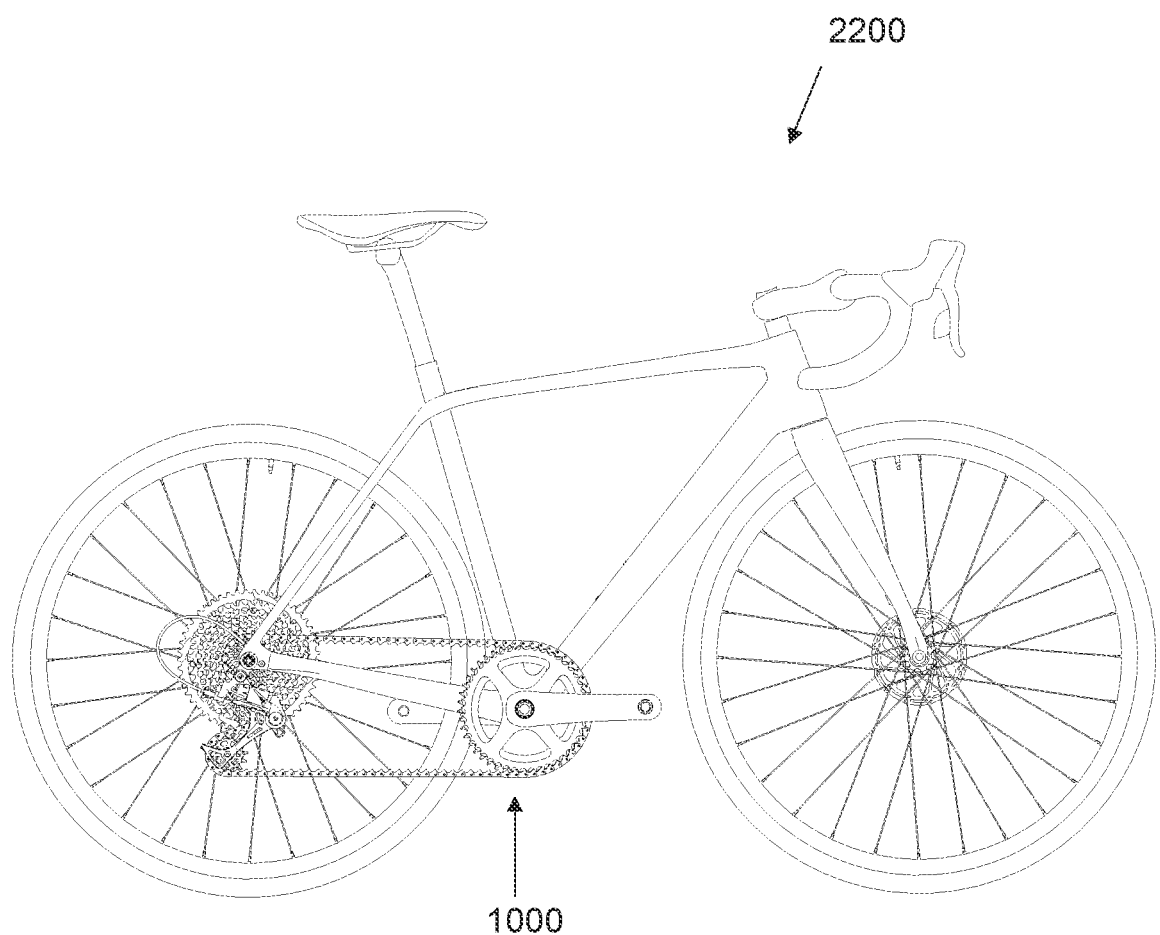
FIG. 22 is a schematic diagram showing a bicycle comprising a chain drive system according to examples.

FIG. 22 shows a bicycle 2200 comprising a chain drive system 1000 according to the embodiments described herein. The bicycle 2200 shown is a multi-speed bicycle comprising a sprocket cassette having a plurality of sprockets, and a derailleur comprising two jockey wheels, used for shifting the chain between sprockets. It will be appreciated that in other examples, the bicycle 2200 is a single speed bicycle comprising a sprocket cassette with one sprocket and a crankset with one chainring.

The above embodiments are to be understood as illustrative examples. Further embodiments are envisaged. For example, although each of the two plate members 224b and 226b shown comprise two teeth in some examples, only one of the plate members 224b or 226b may have teeth. In another example, each of the plate members 224b and 226b has a tooth at an opposing end to the tooth of the other plate member 226b and 224b such that the link element 202b is provided with two teeth, one tooth at the first end of the link element 202b and the second tooth at the second end of the link element 202b. In some examples, the link elements 202a to 202c each comprise at least three teeth, the first tooth being formed from at least one of the two plate members 224b and 226b at the first end of the link element 202b, the second tooth being formed from at least one of the two plate members 224b and 226b at the second end of the link element 202b, and a third tooth at the second end of the link element 202b, the third tooth being formed from the other of the two plate members 226b and 224b. In other words, the second and third teeth are provided by different respective plate members 224b and 226b and the first tooth is provided by either of the two plate members 224b and 226b. By providing at least three teeth a contact area between the link elements and the sprockets may be increased, thereby increasing the resiliency of the chain to driving forces provided by the sprockets.

In other examples, a sprocket in a sprocket cassette used in the chain drive system may have a similar construction to the chainring 324, in other words comprising a plurality of drive teeth and a plurality of guide teeth. In this way force may be applied in the reverse direction to allow the chain to be used in implementations where reverse drive is desired, such as in a track bicycle to be used in a velodrome.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure.

Numbered Clauses

The following numbered clauses describe various embodiments of the present disclosure.

1. A chain for a bicycle comprising a plurality of interleaved link elements, each link element of the plurality of link elements being pivotably attached to at least one other link element of the plurality of link elements and comprising at least two teeth, wherein a flank of each tooth is adapted to engage with a flank of a sprocket tooth.

2. A bicycle chain according to clause 1, wherein the chain is adapted to engage with sprockets having fewer than 13 teeth.

3. A chain according to clause 1 or clause 2, wherein the plurality of link elements is adapted to allow articulation of each link element with respect to an adjacent link element by at least 33 degrees in a first direction from an arrangement in which respective lengths of the link element and the adjacent link element are parallel.

4. A chain according to any of clauses 1 to 3, wherein the plurality of link elements is adapted to allow articulation of each link element with respect to an adjacent link element by at least 54 degrees.

5. A chain according to any preceding clause, wherein each link element has a width of no more than 4.5 millimetres.

6. A chain according to any preceding clause, wherein at least a portion of a flank of each tooth is adapted to engage with a flank of a sprocket.

7. A chain according to clause 6, wherein the at least a portion of a flank of each tooth has a straight profile.

8. A chain according to any preceding clause, wherein each link element comprises a first tooth located at a first end and a second tooth located at a second end, and a recess is provided in a first side between a respective first tooth and a respective second tooth, the recess being for receiving a sprocket tooth and enabling the sprocket tooth to engage with a flank of at least one of the first and second teeth and substantially maintain a relative arrangement of the chain along an axis which is substantially parallel to a rotational axis of the sprockets.

9. A chain according to clause 8, wherein the first tooth is laterally offset from the second tooth such that a first plane in which sprocket teeth engage with the first tooth is parallel to and offset from a second plane in which sprocket teeth engage with the second tooth.

10. A chain according to clause 9, wherein each link element comprises a further recess on a second side of the link element opposing the first side to allow a sprocket tooth of a jockey wheel to be received in the further recess during reverse articulation of the chain around said jockey wheel.

11. A chain according to any of clauses 9 to 10, wherein a respective first end of a first link element is pivotably attached by a pin joint to a respective second end of a second link element such that a respective first tooth of the first link element at least partially overlaps with a respective second tooth of the second link element.

12. A chain according to clause 11, wherein the first tooth of the first link element and the second tooth of the second link element each extend away from the pin joint in a direction which is perpendicular to an axis of rotation of the pin joint, and wherein the second tooth extends further from the pin joint than the first tooth.

13. A chain according to any one of clauses 1 to 7, wherein each link element comprises a first end having a curved profile and a second end at which a first tooth and a second tooth are located, and wherein a recess provided in a first side between the first end and the second end, the recess being for receiving a sprocket tooth and enabling the sprocket tooth to engage with a flank of the link element at the first end.

14. A chain according to clause 13, wherein the first tooth is laterally offset from the second tooth such that a first plane in which sprocket teeth engage with the first tooth is parallel to and offset from a second plane in which sprocket teeth engage with the second tooth.

15. A chain according to clause 14, wherein each link element comprises a further recess on a second side of the link element opposing the first side to allow a sprocket tooth of a jockey wheel to be received in the further recess during reverse articulation of the chain around said jockey wheel.

16. A chain according to clause 14 or clause 15, wherein a respective first end of a first link element is pivotably attached by a pin joint to a respective second end of a second link element such that a respective first end of the first link element at least partially overlaps with a respective second end of the second link element.

17. A chain according to any of clauses 8 to 16, wherein each link element comprises two plate members, the plate members being in contact at a respective first end of the link element and being spaced from one another at a respective second end of the link element, such that the recess is provided between the two plate members.

18. A chain according to clause 17, wherein each link element comprises at least three teeth, the first tooth being formed from at least one of the two plate members at the first end of the link element, the second tooth being formed from at least one of the two plate members at the second end of the link element, and a third tooth at the second end of the link element, the third tooth being formed from the other of the two plate members.

19. A chain according to clause 18, wherein each of the two plate members comprise at least one bend.

20. A chain according to clause 19, wherein at least one bend in each of the two plate members offsets a first end of plate member from a second end of the plate member by at least a thickness of the plate member, and wherein a length of the bend is equal to or greater than the thickness of the plate member.

21. A chain according to any of clauses 17 to 20, wherein the first end of the first link element is located between two plate members of the second link element at the respective second end of the second link element, and wherein the respective second tooth of the second link element is coplanar with a respective second tooth of the first link element in a plane extending along the length of the link elements.

22. A chain according to any preceding clause, wherein each link element is pivotably attached to at least one other link element of the plurality of link elements by a rocker pin joint.

23. A chain according to clause 22, wherein each link element comprises a first aperture at one end of the link element, the first aperture being for fixedly receiving a pin member having an ovate cross section, and each link element comprises a second aperture at another end of the link element, the second aperture for receiving the pin member having an ovate cross section, wherein a profile of the second aperture is adapted to allow the pin member to roll against an inner surface of the second aperture through at least part of a range of articulation of the link element with respect to an adjacent link element.

24. A chain according to clause 23, wherein a portion of the second aperture has a profile which is defined by an arc having a constant radius, such that for a part of the range of articulation of the link element with respect to the adjacent link element the pin member is adapted to concentrically slide along at least a part of the portion of the second aperture which is defined by an arc having a constant radius.

25. A chainring adapted to drive a chain according to any preceding clause, the chainring comprising a plurality of sprocket drive teeth, wherein each of the plurality of sprocket drive teeth have a driving flank with a profile corresponding to the profile of at least one of the teeth of each of the plurality of link elements.

26. A chainring adapted to drive a chain according to any of clauses 7 to 15, wherein the chainring comprises a plurality of sprocket drive teeth for engaging with respective second teeth of the link elements of the chain to drive the chain and comprising a plurality of guide teeth, wherein each guide tooth is configured to be received in the recess and substantially maintain a relative location of the chain with respect to the chainring to allow the sprocket drive teeth to engage with and drive the respective second teeth of the link elements of the chain.

27. A chainring according to clause 26, wherein the chainring comprises fewer guide teeth than sprocket drive teeth.

28. A crankset comprising a chainring according to any one of clauses 25 to 27.

29. A crankset according to clause 28, comprising a plurality of chainrings according to any one of clauses 25 to 27, wherein each chainring of the plurality of chainrings comprises a different number of sprocket drive teeth to the other chainrings of the plurality of chainrings.

30. A sprocket cassette for being driven by a chain according to any of clauses 1 to 24, the sprocket cassette comprising one or more sprockets, each sprocket comprising a plurality of sprocket teeth, wherein each of the plurality of sprocket teeth have a flank with a profile corresponding to the profile of at least part of a tooth of each of the plurality of link elements.

31. A sprocket cassette according to clause 30, the sprocket cassette comprising a first group of one or more sprockets adapted to be driven in a first direction by the chain and further comprising a second group of one or more sprockets adapted to be driven in a second direction, each of the second group of one or more sprockets being directly adjacent to at least one of the first group of one or more sprockets, wherein the first direction is opposite to the second direction.

32. A sprocket cassette according to clause 30 or clause 31, wherein at least one of the first group of one or more sprockets has sprocket teeth including a first sprocket tooth profile, and at least one of the first group of one or more sprockets has sprocket teeth including a second sprocket tooth profile, wherein the first sprocket tooth profile is different to the second sprocket tooth profile.

33. A chain drive system comprising:
a chain as described in any of clauses 1 to 24;
a crankset as described in clause 28 or clause 29; and
a sprocket cassette as described in any of clauses 30 to 32.

34. A chain drive system according to clause 33, wherein the sprocket cassette comprises a plurality of sprockets, and the chain drive system comprises a derailleur to provide shifting between the plurality of sprockets of the sprocket cassette.

35. A bicycle comprising a chain drive system according to clause 33 or clause 34.

What is claimed is:

1. A chain for a bicycle comprising a plurality of interleaved link elements, wherein each link element of the plurality of link elements is pivotably attached to at least one other link element of the plurality of link elements and comprises:
two plate members, the plate members being in contact at a first end of the link element and being spaced from one another at a second end of the link element;
at least two teeth including a first tooth located at the first end and a second tooth located at the second end of the link element, wherein a flank of each tooth is adapted to engage with flanks of sprocket teeth and sustain a driving force applied therebetween, and wherein the first tooth is laterally offset from the second tooth such that a first plane in which the first tooth is adapted to engage with a sprocket tooth is parallel to and offset from a second plane in which the second tooth is adapted to engage with an adjacent sprocket tooth; and
a recess provided between the two plate members and in a first side between the first end and the second end, the recess being configured to receive a sprocket tooth therein to substantially maintain a lateral arrangement of the chain and enable the sprocket tooth to engage with a flank of a first tooth located at a respective first end of an adjacent link element in the first plane.

2. The chain according to claim 1, wherein the chain is adapted to engage with sprocket teeth of sprockets that have fewer than 13 sprocket teeth.

3. The chain according to claim 1, wherein the plurality of link elements is adapted to allow articulation of each link element with respect to an adjacent link element by at least 33 degrees in a first direction from an arrangement in which a length of the link element and a length of the adjacent link element are parallel.

4. The chain according to claim 1, wherein at least a portion of a flank of each tooth has a straight profile.

5. The chain according to claim 1, wherein each link element comprises a further recess on a second side of the link element opposing the first side to allow a sprocket tooth of a jockey wheel to be received in the further recess during reverse articulation of the chain around said jockey wheel.

6. The chain according to claim 1, wherein each link element comprises a third tooth located at the second end.

7. The chain according to claim 6, wherein the third tooth is laterally offset from the first tooth and the second tooth such that a third plane in which the third tooth is adapted to engage with sprocket teeth is parallel to and offset from the first plane and the second plane.

8. The chain according to claim 7, wherein each link element comprises a further recess on a second side of the link element opposing the first side to allow a sprocket tooth of a jockey wheel to be received in the further recess during reverse articulation of the chain around said jockey wheel.

9. The chain according to claim 7, wherein a respective first end of a first link element is pivotably attached by a pin joint to a respective second end of a second link element such that a respective first end of the first link element at least partially overlaps with a respective second end of the second link element.

10. The chain according to claim 1, wherein each link element comprises at least three teeth, the first tooth being formed from at least one of the two plate members at the first end of the link element, the second tooth being formed from a first one of the two plate members at the second end of the link element, and a third tooth at the second end of the link element, the third tooth being formed from a second different one of the two plate members.

11. The chain according to claim 10, wherein each of the two plate members comprise at least one bend.

12. The chain according to claim 1, wherein each link element is pivotably attached to at least one other link element of the plurality of link elements by a rocker pin joint.

13. The chain according to claim 12, wherein each link element comprises a first aperture at one end of the link element, the first aperture being for fixedly receiving a pin member having an ovate cross section, and each link element comprises a second aperture at another end of the link element, the second aperture for receiving the pin member having an ovate cross section, wherein a profile of the second aperture is adapted to allow the pin member to roll against an inner surface of the second aperture through at least part of a range of articulation of the link element with respect to an adjacent link element.

14. The chain according to claim 1, wherein the plate members are integrally formed at the first end.

15. A chainring adapted to drive a chain for a bicycle comprising a plurality of interleaved link elements, wherein each link element of the plurality of link elements is pivotably attached to at least one other link element of the plurality of link elements and comprises:
- two plate members, the plate members being in contact at a first end of the link element and being spaced from one another at a second end of the link element;
- at least two teeth including a first tooth located at a first end and the second tooth located at the second end of the link element, wherein a flank of each tooth is adapted to engage with flanks of sprocket teeth and sustain a driving force applied therebetween, and wherein the first tooth is laterally offset from the second tooth such that a first plane in which the first tooth is adapted to engage with a sprocket tooth is parallel to and offset from a second plane in which the second tooth is adapted to engage with an adjacent sprocket tooth; and
- a recess provided between the two plate members and in a first side between the first end and the second end, the recess being configured to receive a sprocket tooth therein to substantially maintain a lateral arrangement of the chain and enable the sprocket tooth to engage with a flank of a first tooth located at a respective first end of an adjacent link element in the first plane, and the chainring comprises:
- a plurality of sprocket drive teeth, wherein each of the plurality of sprocket drive teeth have a driving flank with a profile corresponding to the profile of at least one of the teeth of each of the plurality of link elements; and
- a plurality of guide teeth, wherein each guide tooth is configured to be received in the recess of a link element of the plurality of link elements and substantially maintain a lateral arrangement of the chain to enable the sprocket drive teeth to engage with and drive the second tooth of the link element.

16. A sprocket cassette for being driven by a chain for a bicycle comprising a plurality of interleaved link elements, wherein each link element of the plurality of link elements is pivotably attached to at least one other link element of the plurality of link elements and comprises:
- two plate members, the plate members being in contact at a first end of the link element and being spaced from one another at a second end of the link element;
- at least two teeth including a first tooth located at a first end and the second tooth located at the second end of the link element, wherein a flank of each tooth is adapted to engage with flanks of sprocket teeth and sustain a driving force applied therebetween, and wherein the first tooth is laterally offset from the second tooth such that a first plane in which the first tooth is adapted to engage with a sprocket tooth is parallel to and offset from a second plane in which the second tooth is adapted to engage with an adjacent sprocket tooth; and
- a recess provided between the two plate members and in a first side between the first end and the second end, the recess being configured to receive a sprocket tooth therein to substantially maintain a lateral arrangement of the chain and enable the sprocket tooth to engage with a flank of a first tooth located at a respective first end of an adjacent link element in the first plane, and the sprocket cassette comprises:
- one or more sprockets, each sprocket comprising a plurality of sprocket teeth, wherein each of the plurality of sprocket teeth have a flank with a profile corresponding to the profile of at least part of the respective first tooth of each of the plurality of link elements, and having a width that is less than a width of the recess in the first side of a link element.

* * * * *